US012320972B2

(12) United States Patent
McCafferty

(10) Patent No.: US 12,320,972 B2
(45) Date of Patent: Jun. 3, 2025

(54) REDUCING EFFECTS CAUSED BY FORMATION OF MULTIPLE FOCI IN A DEFORMABLE LENS DURING CHANGES OF APPLANATION OF SURFACES THEREOF

(71) Applicant: CONEXUS LENS, INC., Tucson, AZ (US)

(72) Inventor: Sean J. McCafferty, Tucson, AZ (US)

(73) Assignee: CONEXUS LENS, INC., Tucson, AZ (US)

( * ) Notice: Subject to any disclaimer, the term of this patent is extended or adjusted under 35 U.S.C. 154(b) by 0 days.

(21) Appl. No.: 18/273,487

(22) PCT Filed: Jan. 20, 2022

(86) PCT No.: PCT/US2022/013097
§ 371 (c)(1),
(2) Date: Jul. 20, 2023

(87) PCT Pub. No.: WO2022/159561
PCT Pub. Date: Jul. 28, 2022

(65) Prior Publication Data
US 2025/0110329 A1 Apr. 3, 2025

Related U.S. Application Data

(60) Provisional application No. 63/196,327, filed on Jun. 3, 2021, provisional application No. 63/140,195, filed on Jan. 21, 2021.

(51) Int. Cl.
G02B 26/08 (2006.01)
G02B 7/04 (2021.01)

(52) U.S. Cl.
CPC ........... *G02B 26/0875* (2013.01); *G02B 7/04* (2013.01)

(58) Field of Classification Search
CPC ............................. G02B 26/0875; G02B 7/04
USPC ........................................................ 359/642
See application file for complete search history.

(56) References Cited

U.S. PATENT DOCUMENTS

| 9,848,980 B2 | 12/2017 | McCafferty |
| 10,191,261 B2 | 1/2019 | McCafferty |
| 10,307,247 B2 | 6/2019 | McCafferty |

(Continued)

FOREIGN PATENT DOCUMENTS

| WO | 2015134058 A1 | 9/2015 |
| WO | 2016022771 A1 | 2/2016 |

OTHER PUBLICATIONS

PCT International Search Report and Written Opinion, PCT/US2022/013097, May 3, 2022, 13 pages.

*Primary Examiner* — William Choi
(74) *Attorney, Agent, or Firm* — Quarles & Brady LLP; Yakov Sidorin

(57) ABSTRACT

Accommodating (re-focusable) lens system that includes multiple elastically-deformable lenslets sequentially disposed along an optical axis and that has an optical power that is varied by changing the degree of applanation of an area of contact between the constituent lenslets in response to variation of force applied to the lenses axially by an external element connected with or forming a part of the lens system housing and/or lenslet support element. Method for operating the same in a manner that reduces optical wavefront errors introduced by the process of refocusing thereby improving imaging characteristics of the lens system.

16 Claims, 20 Drawing Sheets

(56) References Cited

U.S. PATENT DOCUMENTS

2011/0149409 A1 6/2011 Haugholt et al.
2017/0235113 A1 8/2017 McCafferty

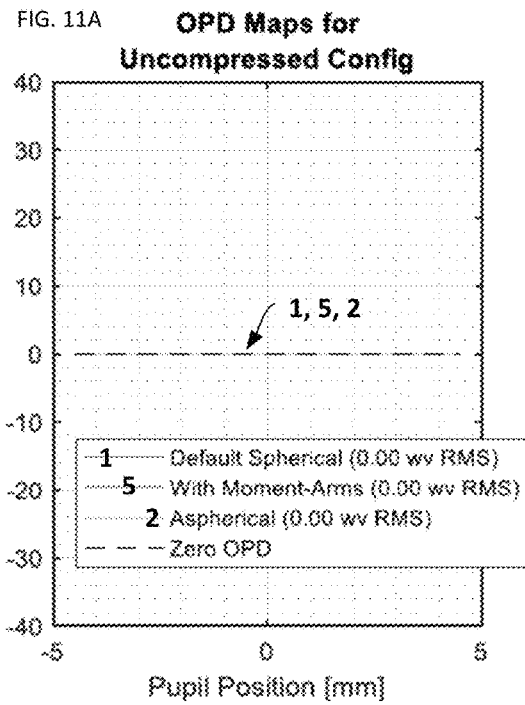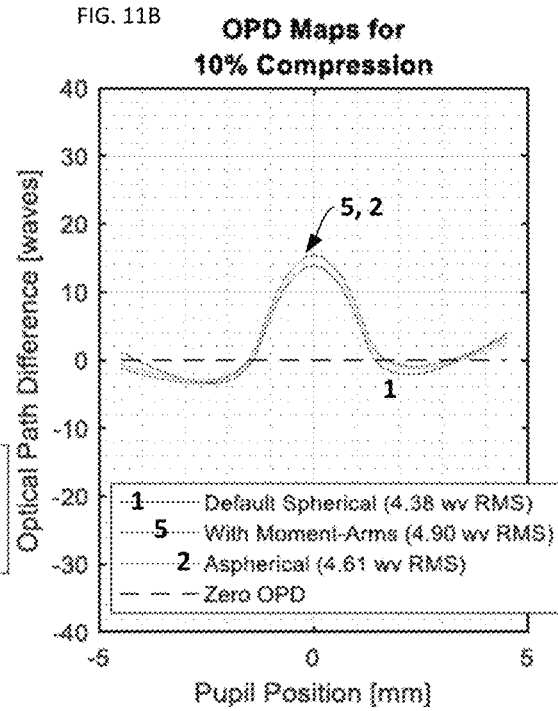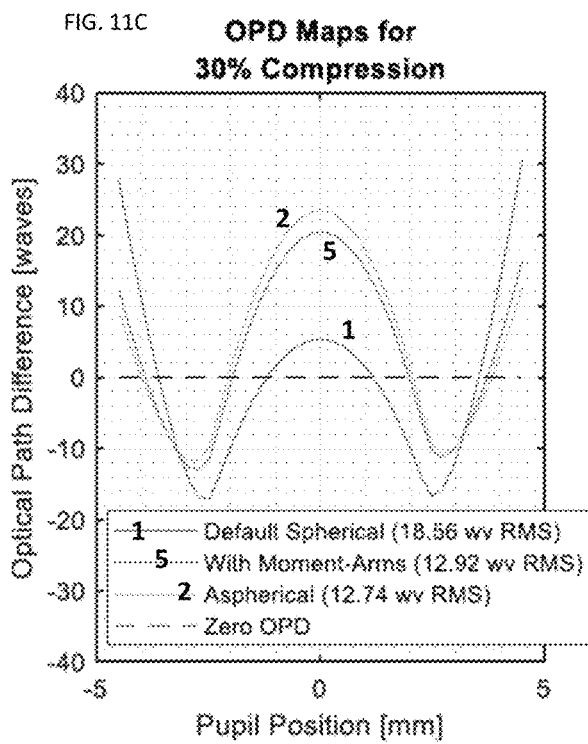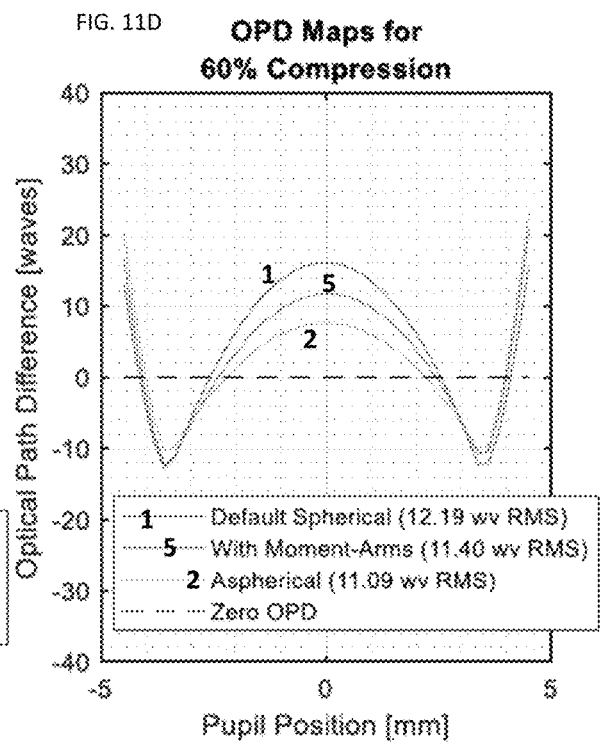

REDUCING EFFECTS CAUSED BY FORMATION OF MULTIPLE FOCI IN A DEFORMABLE LENS DURING CHANGES OF APPLANATION OF SURFACES THEREOF

CROSS-REFERENCE TO RELATED APPLICATIONS

This patent application is a U.S. national phase application under 35 U.S.C. § 371 of International Application No. PCT/US2022/013097, filed Jan. 20, 2022 and now published as WO 2022/159561 A1, which claims priority from and benefit of U.S. Provisional Patent Application Nos. 63/140,195 filed on Jan. 21, 2021 and No. 63/196,327 filed on Jun. 3, 2021. The disclosure of each of these applications is incorporated by reference herein in their entirety for all purposes.

TECHNICAL FIELD

The present invention relates to a refocusable lens system and, in particular, to an elastically-deformable multi-lens system configured to have its effective focal length continuously changed as a result of flattening or applanating of an axial portion of a surface of a constituent lens (lenslet) of such multi-lens system. Such multi-lens systems can be of use as imaging lenses and/or objectives in various applications of opto-mechanical systems.

RELATED ART

A skilled artisan will readily appreciate that a re-focusable lens system configured to operate by having its optical power changed as a result of forming and/or altering the applanated (flattened or even flat) surface areas of contact between the surfaces of the individual elastically deformable constituent lenslets, of the lens system is an operable imaging system. (Examples of such re-focusable lens system were discussed, for example, in U.S. Pat. Nos. 9,848,980; 10,191,261; 10,307,247; International patent applications publications WO 2015/134058, WO 2016/022771, to name just a few. The disclosure of each of these patent documents, describing an operation of such lens system, is incorporated by reference in its entirety.)

At the same time, during at least a portion of the operational transition of such lens system of related art (that is during the refocusing procedure, for example from the shorter focal length to the longer focal length), such lens system may operate while undesirably distorting the optical wavefront of light propagating though it (that is, by introducing the wavefront error) that diminishes the quality of the optical image that could otherwise be achieved. One way to illustrate the source of such wavefront error is to consider, for example, an operational transition of a multi-lenslet lens system of related art (see either U.S. Pat. No. 9,848,980 or U.S. Pat. No. 10,191,261) from the non-applanated state (or, a less applanated state) of such a lens system to the fully-applanated state (or, a state in which a lenslet is applanated to a higher degree) during the compression of at least one of the constituent lenslets against another. A skilled artisan will readily appreciate that in the non-applanated state the reference lens system has a shorter focal length (when the facing each other surfaces of the adjoining lenslets of the lens system are not under stress and are in contact with one another at a point of the optical axis). In the partially—or even fully-applanated state, however, the same lens system has a longer focal length (as substantially all surface area of contact between the facing-each-other surfaces of adjoining lenslets—or at least a significant portion of such surface area—is at least flattened as compared to the surface profile of the same surface(s) in the non-applanated state, or even flat). For each constituent elastically-deformable/mechanically-pliable lens or lenslet of the overall lens system that participates in such operational transition, the area of the flat portion of the surface of the corresponding lenslet is centered on the optical axis and is increasing with the increased degree of applanation. At the same time, for each of the mutually-applanating lenslets, such flat (inner, axially-centered) surface area is circumscribed by an (outer) annulus of the lenslet surface that remains curved. Understandably, then the optical portions of the lens system that operationally include the applanated portions of the surfaces of the constituent lenslets generally define one focal length (and, therefore, optical power) of the system, while the optical portions of the lens system that operationally include the outer, not-applanated portions of the surfaces of the constituent lenslets is characterized by a different optical power represented by the different value of the focal length. The process of operational transition from one level or degree of lens-surface applanation to another level or degree of lens-surface applanation practically results in formation of multiple foci (for the overall lens system) due to simultaneous presence, in a given surface of a given constituent lenslet, of both a flattened/applanated surface portion and a curved surface portion. Put differently, the presence of more than a single optical power characteristics in the same lens system during the process of applanation (or, similarly, during the process of reduction of applanation) of the constituent lenslets manifests in undesired wavefront error introduced by the lens system The optical-wavefront-distorting nature of a transition between the near-focus state and the far-focus state of the lens system understandably deteriorates, in practice, the image quality at best focus (that is, at the surface located between the near and far foci extremes and chosen such that the rms spot size of a corresponding spot-diagram reaches its minimum), thereby causing the refocusable lens systems of related art to be diffraction-limited substantially only at the extremes of a given operational transition (where the surfaces of the constituent lenslets are either completely unapplanated or completely applanated). A solution to this operational shortcoming is required.

SUMMARY

An embodiment of the present invention provides a method for operating an optical system that has an optical axis. The method includes the step of transmitting light, incident onto a front surface of the optical system having a first optical power, through two surfaces of constituent first and second lenslets of the optical system that are coaxial with the optical axis and in contact with one another at a first contact region having a first contact surface area and centered on the optical axis. The method further includes a step of changing an optical power of the optical system from the first optical power to a second optical power by axially repositioning a first of the two surfaces along the optical axis to form a second contact region between the first and second of the two surfaces, the second contact region having a substantially flat surface and having a second contact surface area different from the first contact surface area.

The method may additionally include substantially any combination of the steps and/or conditions (a), (b), (c), and (d). Step (a) includes a process of altering an auxiliary external force to either compress at least one auxiliary lenslet and a chosen lenslet of the constituent first and second lenslets against one another along the optical axis or to relax axial pressure exerted by one of the at least one auxiliary lenslet and the chosen lenslet on the other of the two, thereby changing an applanated contact area between a surface of the at least one auxiliary lenslet and a surface of the chosen lenslet. The alternative or additional step (b) is the step of shifting at least a portion of a circumferential edge of at least one of constituent lenslets of the optical system along the optical axis while substantially not affecting an axial position of a center of such at least one of constituent lenslets. The alternative or additional step/condition (c) is defined by the situation when at least one of the steps of changing the optical power of the optical system from the first optical power to the second optical power by axially repositioning the first of the two surfaces along the optical axis, and altering the auxiliary external force (that is, step (a)) includes changing a degree of applanation of a first aspheric surface and/or a second aspheric surface of two facing each other surfaces of constituent lenslets of the optical system. The alternative or additional step (d) entails applying a radially-directed load to a circumferential edge of at least one of constituent lenslets of the optical system. In at least one implementation of the method—and, specifically, in the implementation that involves at least step (b), the process of shifting at least a portion of a circumferential edge of at least one of constituent lenslets of the optical system along the optical axis may include either a process of moving at least a part of the circumferential edge of the at least one of the two immediately neighboring constituent lenslets of the optical system by transferring an axial force applied to the at least one of the two immediately-neighboring constituent lenslets to the target (at least) a part of said circumferential edge with the use of haptics of the two constituent lenslets connected to one another at ends thereof, or a process of moving at least part of the circumferential edge of interest of at least one of the two immediately neighboring constituent lenslets of the optical system by applying an axially-directed force to one of first and second regions of a surface of the lenslet of interest. (Here, the first and second regions are at two respective different radial locations of the surface at hand.) At least in the case of such specific implementation of the method, the step of transferring may include applying the axial force to a haptic that has an annular region with an inner perimeter (here, the inner perimeter circumscribes and is attached to the circumferential edge).

In substantially any embodiment of the method, at least one of the steps of altering an auxiliary external force, shifting, changing a degree of applanation of the first aspheric surface and/or the second aspheric surface, and applying a radially-directed load may be carried out substantially simultaneously with the step of changing the optical power of the optical system from the first optical power to the second optical power and/or with the process of altering the auxiliary external force. Alternatively or in addition—and in substantially every and any implementation of the method—each of the steps of changing the optical power of the optical system from the first optical power to the second optical power, altering an auxiliary external force, shifting, changing a degree of applanation of the first aspheric surface and/or the second aspheric surface, and applying a radially-directed load may be carried out reversibly. Alternatively or in addition—and substantially in every and any embodiments of the method—the step of shifting and/or the step of changing a degree of applanation of the first aspheric surface and/or the second aspheric surface, and/or the step of applying a radially-directed load a corresponding step may be performed on only a subset but not all of constituent lenslets of the optical system and/or sequentially (that is, on a pair-by-pair basis, where a pair is a pair of immediately-neighboring constituent lenslets). In one special case, the subset of the lenslets may be defined to include every other constituent lenslet from all constituent lenslets of the optical system. Alternatively or in addition— and substantially in every and any embodiment of the method that employs at least step (a)—the method may satisfy at least one of the following conditions: (i) a degree of changing an applanated contact area between the surface of the auxiliary lenslet and the surface of the chosen lenslet depends on a degree of altering the auxiliary external force; and (ii) at least one auxiliary lenslet is in contact with the chosen lenslet of the constituent first and second lenslets at an axial point of the surface of the at least one auxiliary lenslet when the at least one auxiliary lenslet and said chosen lenslet are not under stress; and (iii) the step of altering an auxiliary external includes either compressing a sequence of multiple auxiliary lenslets, which are in contact with one another at corresponding axial points when said multiple auxiliary lenslets are not under stress, against the chosen lenslet or relaxing axial pressure exerted by one of the sequence and the chosen lenslet on the other, thereby changing multiple applanated contact areas between surfaces of the multiple auxiliary lenslets.

Embodiments of the invention also provide for an optical system that has an optical axis and that includes at least a first lenslet coaxial with the optical axis and having a first front surface and a first back surface, and a second lenslet disposed coaxially with the first lenslet and having a second front surface and a second back surface. (Here, the first back surface and second front surface are in contact with one another at an axial point when the first and second lenslets are not under stress.) The optical system may additionally include a support structure containing a first lenslet support element supporting at least the first lenslet and/or a second lenslet support element supporting the second lenslet, a first bearing and/or a second bearing movably connecting the first lenslet support element and/or the second lenslet support element relative to each other and/or the support structure thereby enabling a translation of the first lenslet support element and/or second lenslet support element substantially parallel to the optical axis and/or alternation of stress applied to at least one of the respectively supported first and second lenslets. The alternation of the stress allows to in applanate at least one of the first back surface and the second front surface and to enable alteration of an applanated area of contact between the first back surface and the second front surface that is centered on the optical axis by applying a first external force that advances or retracts at least one of the first lenslet support element and the second lenslet support element with respect to the other and/or by applying a second external force vectored substantially transversely to the optical axis to the first lenslet and/or the second lenslet. The optical system additionally is configured to satisfy one or more of the following requirements (1) through (4). Under requirement (1), the support structure further includes an auxiliary lenslet support element supporting at least one auxiliary lenslet that is co-axial with the optical axis and in contact with a surface of a chosen lenslet of the first and second lenslets of the optical system only at an axial point thereof when the auxiliary lenslet (1550) and the chosen lenslet are not under stress. (Here, the support structure further may additionally include an auxiliary bearing movably connecting the auxiliary lenslet support element to the support structure and/or the first lenslet support element and/or the second lenslet support element, thereby enabling a translation of the auxiliary lenslet support element relative to the first lenslet support element and/or relative to the second lenslet support element in response to an auxiliary external force, and thereby enabling a change in an applanated contact area between a surface of the at least one auxiliary lenslet and a surface of the chosen lenslet by altering an auxiliary external force to either compress the at least one auxiliary lenslet and the chosen lenslet against one another along the optical axis or to relax axial pressure exerted by one of the at least one auxiliary lenslet and the chosen lenslet on the other. Here, in addition, an alternation of the auxiliary external force applanates a surface of the at least one auxiliary lenslet and/or a surface of the chosen lenslet and enables a change in an auxiliary surface area of contact between a surface of the at least one auxiliary lenslet and the surface of the chosen lenslet. Requirement (2) states that at least one of lenslet support elements present in the optical system has corresponding first contacting area and second contacting area cooperated with a corresponding lenslet of the optical system at two respective different radial positions, and wherein the first contacting area and the second contacting area are coupled mechanically with one another to transfer force applied to at least one of the first and second contacting areas onto of the corresponding lenslet to thereby reversibly shifting at least a portion of a circumferential edge of the corresponding lenslet along the optical axis while substantially not affecting an axial position of a center of the corresponding lenslet. Requirement (3) describes that two immediately neighboring lenslets of constituent lenslets of the optical system contain respective haptics or finger0like structures extending radially from circumferential regions of such two immediately neighboring lenslets, the respective haptics dimensioned to be in contact with one another at respective ends thereof to transfer an axial force applied to at least one of the two immediately neighboring lenslets to at least a part of the circumferential edge of the at least one of the two immediately neighboring lenslets thereby reversibly shifting the at least said part along the optical axis while substantially not affecting an axial position of a center of the at least one of the two immediately neighboring lenslets. Under requirement (4), at least one of facing and contacting each other surfaces of the two immediately neighboring lenslets may include, in an unstressed state, an aspheric surface centered on the optical axis, and under requirement (5) the support structure may additionally include a radial loader device movably supported between an inner loader position and an outer loader position (which are defined at a first radial distance from the optical axis and at a second radial distance from the optical axis respectively, with the second radial distance being larger than the first radial distance. (Here, the radial loader device is attached to a respective circumferential edge of at least one of the first, second, and the at least one auxiliary lenslets to apply radially-directed force to such circumferential edge.)

In at least one implementation of the optical system, the support structure may include a housing unit defining a hollow thereon, and a respective portion of the first, second, and at least one auxiliary lenslets may be disposed in the hollow, and the respective portion of at least one of the first, second, and auxiliary support elements may be dimensioned to reversibly move inside the hollow along the optical axis. Alternatively or in addition, the respective portion of at least one of the first, second, and auxiliary support elements may include a piston or a surface of the hollow may carry a thread dimensioned to guide such respective portion of at least one of the first, second, and auxiliary support elements.

Alternatively or in addition—and substantially in each and every implementation of the optical system that satisfies at least the requirement (1)—at least one auxiliary lenslet may include multiple auxiliary lenslets such that the optical system comprises a set of four or more constituent lenslets each contacting an immediately neighboring constituent lenslet at an axial point thereof when these four or more constituent lenslets are not under stress. Alternatively or in addition—and at least in the case of an embodiment that satisfies the requirement (2)—at least one of the first contacting area and the second contacting area may be configured as a portion of a ring centered on the optical axis. Alternatively or in addition—and at least in the case of an embodiment that satisfies the requirement (3)—the haptics or finger-like structures may include corresponding annuli, each having an inner perimeter attached to a circumferential edge of a corresponding of the two immediately neighboring lenslets. Alternatively or in addition—and at least in the case of an embodiment that satisfies the requirement (4)—the aspheric surface is preferably a prolate aspheric surface.

The skilled artisan will readily appreciate that the use of substantially any embodiment of the optical system as identified above for executing an embodiment of the above-described method is also within the scope of the invention and is claimed as such.

BRIEF DESCRIPTION OF THE DRAWINGS

The invention will be more fully understood by referring to the following Detailed Description of Specific Embodiments in conjunction with the not-to scale Drawings, of which:

The invention will be more fully understood by referring to the following Detailed Description of Specific Embodiments in conjunction with the not-to scale Drawings, of which:

FIGS. 11A, 11B, 11C, 11D, and 11E provide plots illustrating fans of optical path difference (OPD) for several degrees of applanation (represented by several degrees of compression of the pair of lenslets) for pairs of lenslets of Examples 1, 2, and 5 each of which is modified to include finger-like haptics according to the principle illustrated in FIG. 8B.

Figure 1B:
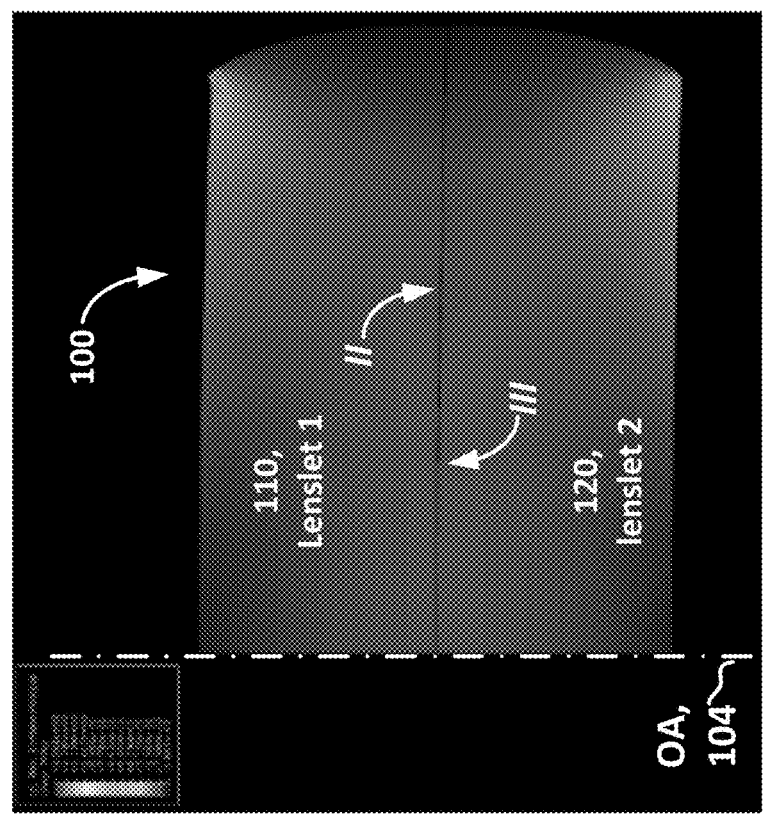
FIGS. 1A and 1B illustrate the profiles, of two mechanically-compliant constituent lenslets with spherical surfaces of an embodiment of the lens system, calculated with the use of Abaqus FEA software for a non-stressed (non-applanated) situation and for a substantially completely applanated situation, respectively. Only half of the lens system is shown, with respect to the optical axis OA.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

According to the idea of the invention, the problem of undesired optical wavefront errors, introduced by the process of applanation of constituent lenslet(s) of a target mechanically-compliant/elastically-deformable lens system is addressed by (re-) configuring such target lens system such as to initially have a large number (or, in a related case—to increase the number) of constituent lenslets forming the target lens system to have multiple sequential applanating lenslets (each optionally with reduced lens power and reduced deformation error) that are combined to produce the desired power change of the overall lens system. The idea of the invention stems from the realization that the absolute contribution to the wavefront error introduced by a given constituent lenslet of the overall lens system is reduced with the reduction of a thickness of such lenslet. Alternatively or in addition, the lens system may be modified by at least adding an aspheric term to the surface profile of at least one of the mutually-facing applanating surfaces of the constituent lenslets, and/or applying compression, torques, and other stresses/forces—for example, by applying a bending moment (also referred to as a circumferential edge moment) to edge(s) of the applanating lenslets and/or by applying directed along a diameter of the lenslets and, therefore, transversely/perpendicularly to the optical axis force (whether stretching or compressing, preferably—a radially-vectored stretching force) force to—to minimize transition deformation and the resultant wavefront errors/aberrations.

The practicality of the proposed solution to the problem of related art is demonstrated below by considering several related iterations of mechanically-compliant multi-lenslet lens systems in each of which at least one of the two facing each other surfaces of the immediately neighboring constituent lenslets are in contact with one another in a rest or steady-state (that is, when the constituent lenslets are under no stress) and are subject to the process of changing a degree of applanation or flattening of such surface(s). Generally, the process of changing a degree of applanation of a given surface is effectuated by application of an external force that advances or retracts a structural support element configured to support and/or act the lenslet with the given surface. Such advancement or retraction may be carried out, for example, with the use of a general bearing arrangement (or bearing, for short), which is conventionally understood in related to be a machine element that constrains relative motion to only the desired motion (and also preferably reduces friction between moving parts). See, for example, en.wikipedia.org/wiki/bearing_(mechanical). The design of the bearing may, for example, provide for free linear movement of the moving part or for free rotation around a fixed axis; or, it may prevent a motion by controlling the vectors of normal forces that bear on the moving parts. Bearings are classified broadly according to the type of operation, the motions allowed, or to the directions of the loads (forces) applied to the parts. Examples of arrangements of a bearing that may be used for the purposes discussed in this disclosure include a linear bearing, a sliding bearing in which one mechanical element such as a cylinder or a piston is repositioned within another mechanical element such as a hollow tubular element, a bearing utilizing a pair of threads, a hinge, a contraption employing a used of piezo-electric crystal, and hydraulic pressure system, a servo motor, to name just a few. In at least one case, the bearing discussed herein operates to establish a degree of freedom of the given surface substantially in parallel to the optical axis. In at least one specific embodiment, the process of changing a degree of applanation of a given lenslet is associated with and caused by a movement enabled and/or carried out only along a direction of the optical axis.

In the course of changing a degree of applanation, the flattened or flat region of contact of the subject lenslet surface with the immediately-neighboring surface of the immediately-neighboring lens is altered, thereby providing a change of optical power) of the lens system and, therefore, allowing for refocusing of the lens system. Optionally, the progressive applanation or flattening of at least one of the surfaces of the immediately-neighboring lenslets is carried out as the corresponding lenslets are being axially compressed (with the use of any applicable structural mechanism such as those examples of which are discussed in, for instance, either U.S. Pat. No. 9,848,980 or U.S. Pat. No. 10,191,261). The comparison between the figures of merit representing wavefront error(s) caused by such iterations of lens system convincingly demonstrates that the structural features introduced in one iteration as compared with a previous iteration do indeed reduce the wavefront error thereby improving the quality of optical imaging. The progression of the discussion is as follows. The first one considered is the simplest configuration of a lens system that includes multiple compliant lenslets each having conventional substantially spherical surfaces, for simplicity of consideration. The following, second lens system structure includes a modification to such first design with respect to the profile of the facing each—other surfaces of these two lenslets in that an aspheric term is added to the surface profile (in one specific case—so as to shape the axial portion of the surface as a prolate aspheric surface portion centered on the optical axis) to reduce optical aberrations observed in the process of applanation of such system—as compared with the optical aberrations of the first lens system—in response to the externally-applied force. At the following step, the two-lenslet system of the first design is compared with a third structure that contains three lenslets (each having simple spherical surfaces) to demonstrate that optical aberrations introduced in the process of applanation of the system having an extra optical lens element are reduced due to the presence of such extra optical lens element. The notion of the use of increasing number of the constituent lenslets in the design to continue to reduce wavefront aberrations is taken further, in that a lens system containing a septuplet of constituent lenslets is then reviewed, showing that the wavefront errors introduced as a result of procedure of applanation of the septuplet lens system are smaller than the wavefront errors introduced as a result of applanation of the lens system of the three lenslets. (Based on these demonstrations, a person of ordinary skill in the art will readily appreciate that substantially any increase of the number of the constituent lenslets in the overall lens system—be it by 1 lenslet, 2 lenslets, 3 lenslets, or N>3 lenslets as compared to the initial, first design necessarily causes the questioned wavefront errors to be reduced, thereby providing practical support to the generalization of the proposed approach based on several demonstrated examples. In addition, demonstration is provided of how induction of a mechanical moment around edge(s) of the lenslet(s) in the overall lens system affect wavefront errors. (It is understood that, in practice, the induction of the circumferential moment can be employed either by itself or in addition to the increase of the number of constituent lenslets in the overall lens system.) Further is considered the example of transverse loading, in which a demonstration is provide of how the application of a mechanical force along the transverse (radial) direction of at least one of the constituent lenslet affects specific aberration modes of such lenslet. Specifically, various transverse loading of the lens system demonstrates potential to induce particular aberration Zernike modes. (Again, the skilled artisan will readily appreciate that the transvers loading methodology can be employed simultaneously with any either of the increase of the number of constituent lenslets in the lens system and/or induction of the circumferential moment.

As these different lens system configurations were considered to be applanated (by introducing axially-directed compression of the constituent lenslets, in a fashion discussed in U.S. Pat. No. 10,191,261, for example; for this reason the practical implementation of the applanation is not addressed in any substantial detail here), the averaged over the overall surface area of a lenslet optical power and optical wavefront aberration were simulated as the level of compression (that is, the degree of applanation) was varied. As will be seen below, under pure axial compression, it is shown that addition of an aspheric term to the spherical profile of a surface of a lenslet of a given design resulted in a reduction of the peak value of wavefront error associated with the process of refocusing the lens system via applanation. Similarly, under pure axial compression, increasing the number of lenslets in the system to M lenslets, M>2, produced the same effect.

Analysis Methodology.

Generally, the lenslets were assumed to be made of a mechanically-compliant (reversibly compressible, elastically-deformable) material with a refractive index of $n=1.5168$ and an isotropic modulus of elasticity of $E=1.0$ kPa (which are similar to those of silicone). The lens designs in no-stress (uncompressed, non-applanated) states were carried out in Zemax OpticStudio optical analysis software. Most models were generated within Zemax OpticStudio and a few models were generated in Abaqus FEA software from the lens prescriptions. During the simulation of the axial compression (applanation) the lens system with the use of finite element algorithm (FEA), the first and last surfaces of the overall lens systems were assumed to be unchanging in profile through compression while intermediate (internal to a given lens system) surfaces of the constituent lenslets were allowed to be compliant and flattened/applanated. The simulated levels of compression were defined to be displacement-driven at 0% (uncompressed, no stress state), 10%, 30%, 60%, and 100% (fully-compressed/applanated) of the maximum sag between the surfaces of the lenslets. The surface profiles at various levels of compression were then exported to data files and processed with Matlab used as an intermediate software to parse to form corresponding grid-sag data files, which were then imported into the Zemax OpticStudio to generate the spatially-deformed (flattened, applanated) lenslet surfaces prepared for raytrace simulations.

The compared with one another configurations of lens systems were designed to be diffraction-limited with approximately 10-Diopters of optical power in a uncompressed (unapplanated, no stress) state and to be diffraction-limited with about 1.25-Diopters when fully compressed. The lenslets were designed to have mechanical diameters of 10.0 mm, center thicknesses of 2.5 mm, and analyzed with optical clear-aperture diameters of 9.0 mm. The optical performance for each system was analyzed at 550 nm considering an on-axis object at an object-distance of infinity. The output wavefront aberrations were recorded as the Root-Mean-Square (RMS) Wavefront-Error (WFE) Optical Path Difference (OPD) from the ideal/reference wavefront and calculated at the image plane chosen to minimize this RMS-OPD-WFE. The overall optical power was calculated by computing a multiple-raytrace over the area of a given lens system's clear aperture and calculating the optical power averaged over the area of such clear aperture.

For the purposes of this disclosure and the appended claims, and unless expressly defined otherwise, the terms "optical wavefront" and "wavefront" define the surface of the optical field containing the set/locus of point at which the optical field has the same phase, as conventionally understood. In that sense, the wavefront errors introduced in operation of the lens systems of related art are those causing substantial deviations of the optical wavefronts from a generally spherical surface. The term "surface" is used according to its technical and scientific meaning to denote a boundary between two media or bounds or spatial limits of a tangible element; it is understood as that which has length and breadth but not thickness, a skin (with a thickness of zero) of a body. The term "optically-conjugate" and related terms are understood as being defined by the principal of optical reversibility (according to which light rays will travel along the originating path if the direction of propagation of light is reversed). Accordingly, these terms, as referring to two surfaces, are defined by two surfaces the points of which are imaged one on to another with a given optical system. If an object is moved to the point occupied by its image, then the moved object's new image will appear at the point where the object originated. The points that span optically-conjugate surfaces are referred to and defined as optically-conjugate points.

Terms such as "radius of curvature", "curvature", "sign of curvature" and related terms are identified in reference to a surface of a lenslet according to their mathematical meanings recognized and commonly used in related art. For example, a radius of curvature of a given curve at a point at the curve is defined, generally, as a radius of a circle that most nearly approximates the curve at such point. The term curvature refers to the reciprocal of the radius of curvature. A definition of a curvature may be extended to allow the curvature to take on positive or negative values (values with a positive or negative sign). This is done by choosing a unit normal vector along the curve, and assigning the curvature of the curve a positive sign if the curve is turning toward the chosen normal or a negative sign if it is turning away from it. For the purposes of the present disclosure and the accompanying claims, a sign of a given curvature is defined according to such convention. For definitions of these and other mathematical terms, a reader is further referred to a standard reference text on mathematics such as, for example, I. N. Bronstein, K. A. Semendyaev, Reference on Mathematics for Engineers and University Students, Science, 1981 (or any other edition). In one example, according to conventions accepted in optical sciences, if the vertex of the curved surface lies to the left of its center of curvature, the radius of curvature and the curvature itself have a positive sign; if the vertex lies to the right of the center of curvature, the radius of curvature and the curvature itself have a negative sign.

As known in the art, the surface of a lenslet is considered to be substantially spherical when it represents a portion of a surface of a sphere, while the term aspherical surface or a similar term generally defines and refers to a surface that spatially deviates from the spherical surface within identified bounds. See, for example, en.wikipedia.org/wiki/Aspheric_lens.

The terms "applanation", "applanate", "flattening", "flatten" and similar terms generally refer to a process or action as a result of which a surface curvature of a subject at hand is being reduced, that is, the surface is being flattened or applanated (resulting in a surface the curvature of which is at least reduced as compared to the initial value of curvature and/or, in a specific case, resulting in a surface that is substantially flat or planar). The term "congruent", when used in reference to chosen first and second elements, specifies that these elements coincide at substantially all points when superimposed.

Numbering of structural surfaces. In describing the order of elements or components in an embodiment of a lens system of the invention or a sub-set of such system, the following convention is generally followed herein, unless stated otherwise. The order in which the surfaces of sequentially positioned structural elements of the lens assembly are viewed along a direction of light incident on the lens system, in operation and/or when installed, from the object is the ascending order in which these surfaces are referred to as the first surface (or surface 1, surface I), the second surface (or surface 2, surface II), the third surface (or surface 3, surface III), the fourth surface (or surface 4, surface IV) and other surfaces if present. Generally, therefore, surfaces of the structural elements (such as individual optical elements) of an embodiment of the invention are numerically labeled starting with a surface that corresponds to the front portion of the lens system and that is facing or even proximal to the object and ending with a surface that corresponds to the back portion of an assembly and that is proximal to an image plane. Accordingly, the term "behind" refers to a position, in space, following a position of something else and suggests that one element or thing is at the back of another as viewed from the front of the lens assembly. Similarly, the term "in front of" refers to a forward place or position, with respect to a particular element as viewed from the front of the assembly. As would be understood by a person of skill in the art, the lens is configured such as to receive light (incident onto from the ambient medium) through its front surface. As the skilled artisan will readily appreciate, when the order of surfaces and/or parameters of individual elements is changed as compared to a particular discussed configuration, the change in optical characteristics and operation of the lens system may be drastic and unpredictable, and requires separate consideration. In other words, arbitrary and/or assumed change in orientation of a given lens system and/or its constituent elements (lenslets) with respect to incident light simply does not provide equivalent or similar results with respect to imaging an object as those for which such given lens system has been configured.

The addressed methodologies relate generally to the field of optics (such as, for example, objectives or lens systems for various imaging applications outside the human or animal body) and in at least one example represent non-medical and/or non-therapeutical methodologies to be performed outside a human body or an animal body or parts thereof—for instance, a methodology of adjusting a focal length of a lens system used for forming an optical image of a given object, a methodology for adjusting a focal length of an optical objective.

Example 1: A Train of Two Lenslets with Substantially Spherical Surfaces

Figure 4A:
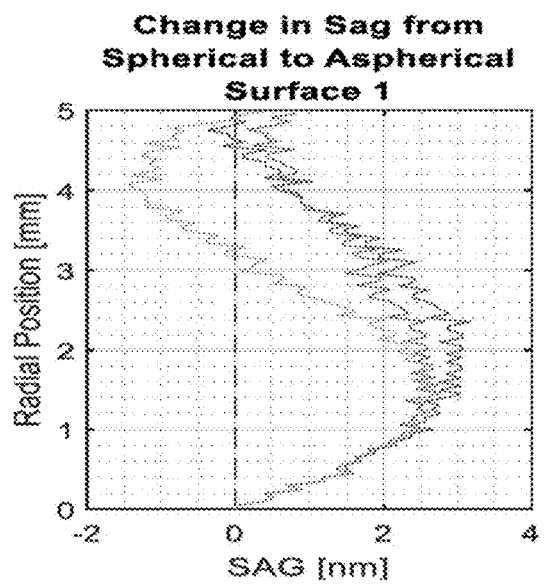
FIGS. 4A, 4B, 4C, and 4D include plots representing changes in surface sag profiles resulting from the axial compression of the lenslets in a pair of lenslets (that leads to the change in applanation of the lenlets' surfaces) for the pair of lenslets with spherical surfaces and for the pair of lenslets with aspherical surfaces, corresponding to the graphs of FIGS. 3A, 3B.
Figure 4B:
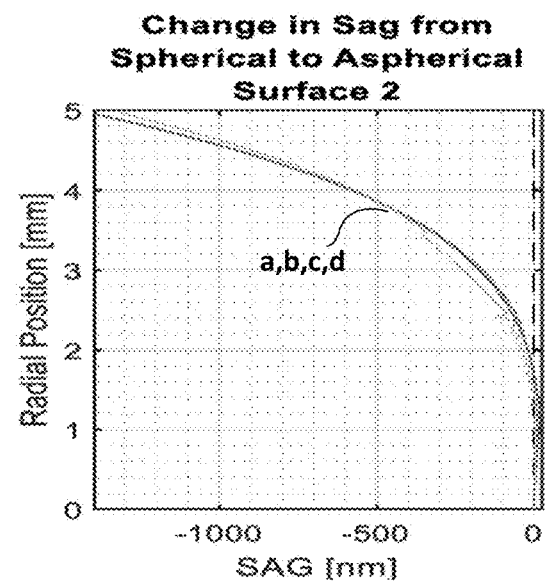
Figure 4C:
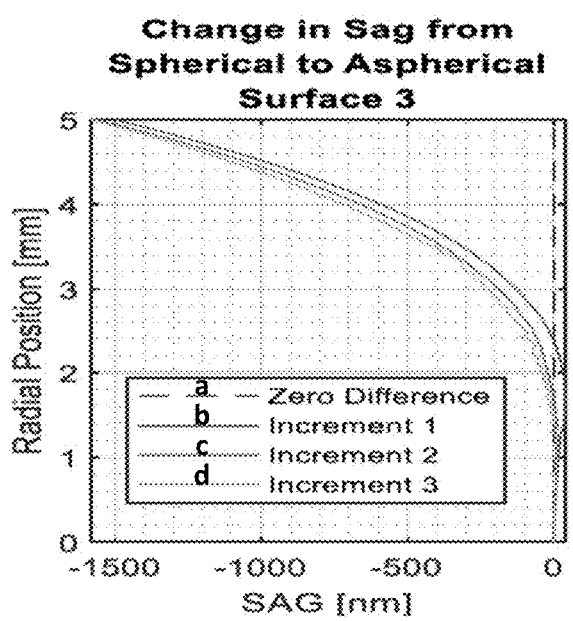
Figure 4D:
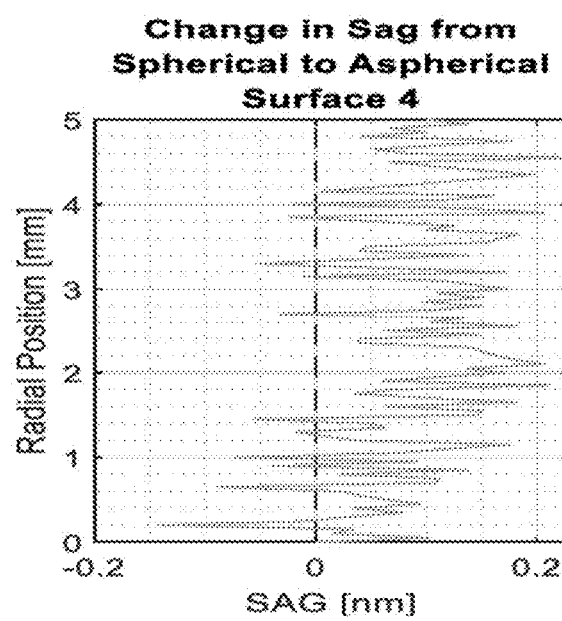
Figure 5A:
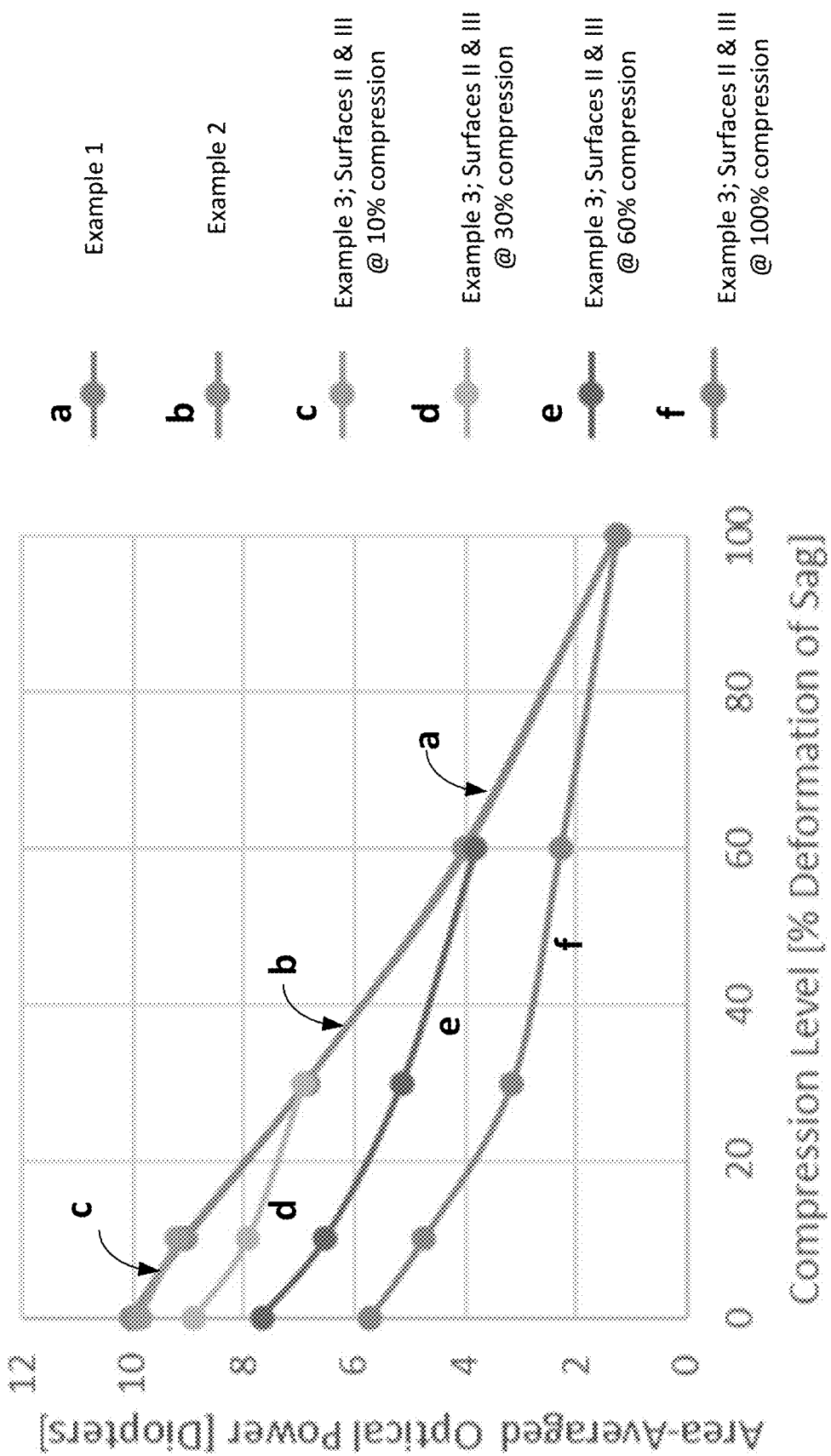
FIGS. 5A, 5B present plots illustrating respectively variations of area-averaged optical powers and wavefront errors as functions of applanation of a given pair of mutually-facing surfaces (surfaces II and III) of constituent lenslets of the embodiments of lens systems of Examples 1, 2, and 3.
Figure 5B:
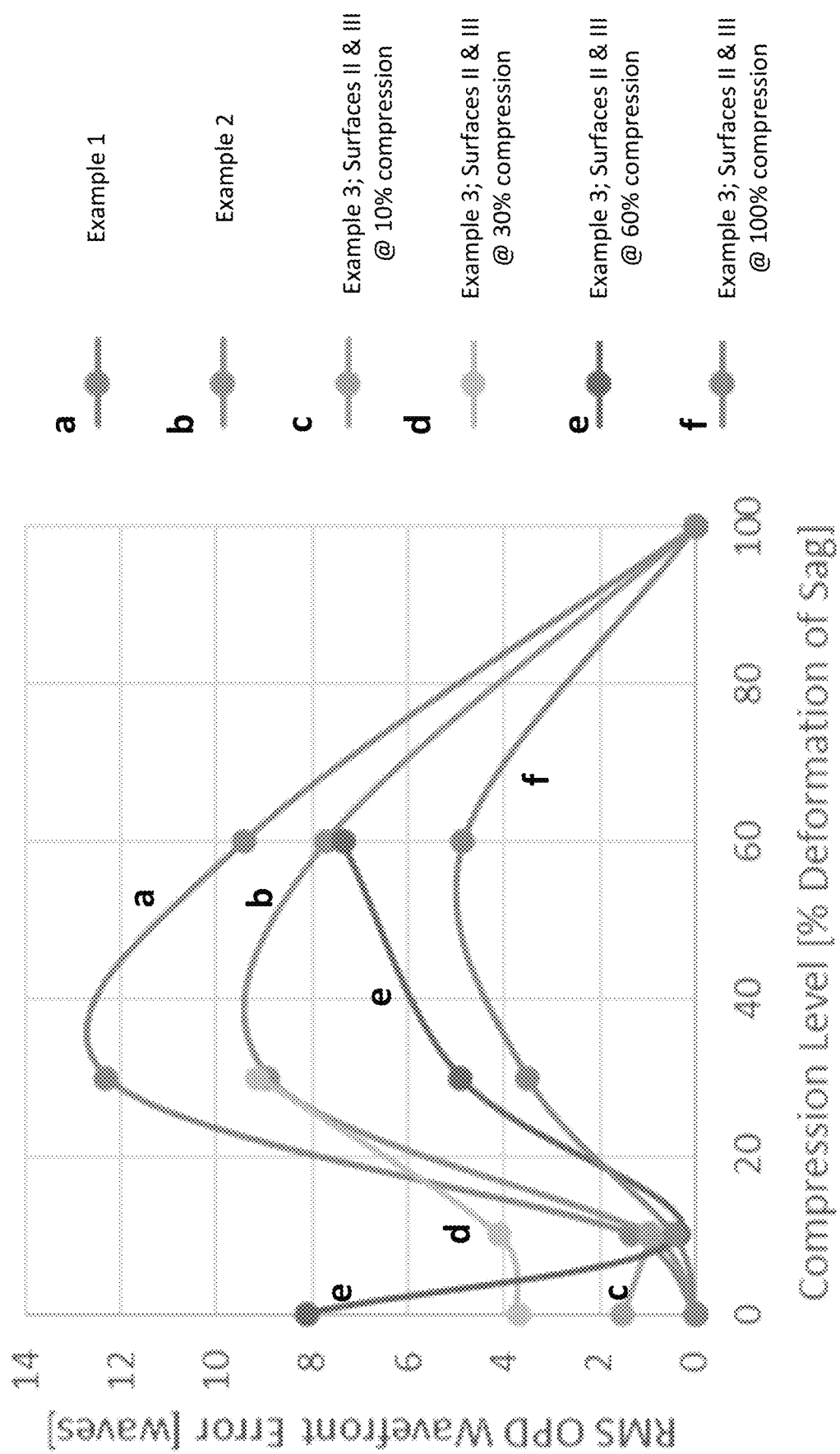

The first considered scenario included the lens system containing two simple co-axial lenslets (see Table 1) that were, in a non-stressed (non-applanated) state the facing-each other surfaces II and III of which were in contact with one another at an axial point (a schematic reference for such easily-visualized configuration is provided by FIG. 4A of U.S. Pat. No. 10,191,261)

TABLE 1

| Design 1: Two Lenslets | Radius of Curvature: | Surface Profile: |
|---|---|---|
| Lenslet 1-Surface I: | 119.177 mm | Convex |
| Lenslet 1-Surface II: | 785.827 mm | Convex |
| Lenslet 2-Surface III: | 63.952 mm | Convex |
| Lenslet 2-Surface IV: | 166.640 mm | Concave |

Figure 1A:
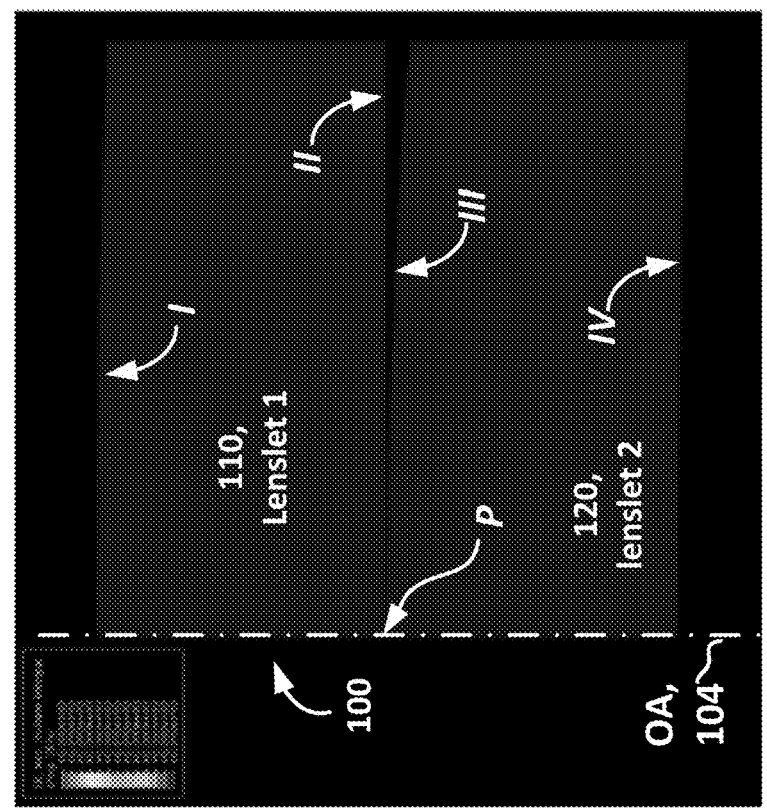
Figure 2A:
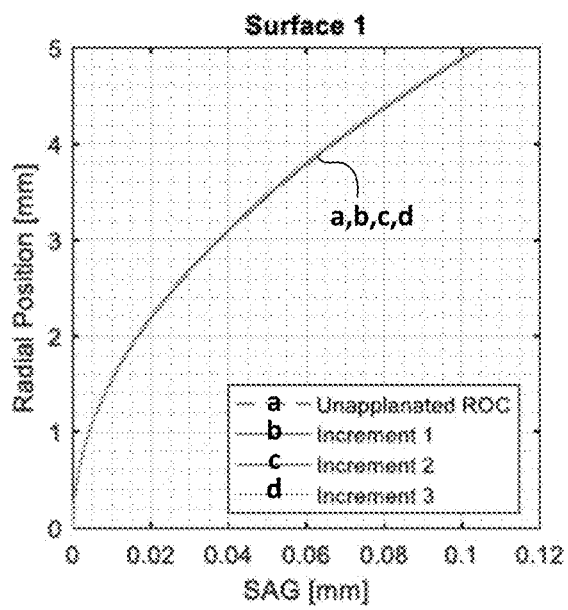
FIGS. 2A, 2B, 2C, and 2D provide plots illustrating the change in surface sag, as a function distance of a particular surface point from the optical axis OA, for the surfaces of the lens system of FIGS. 1A, 1B for several levels of applanation.
Figure 2B:
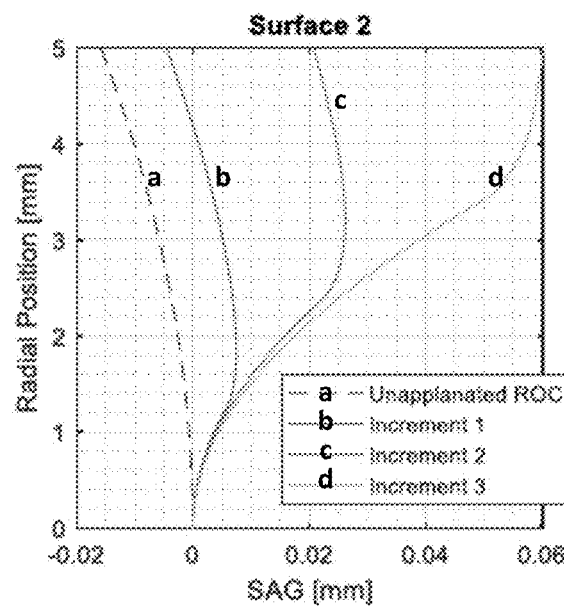
Figure 2C:
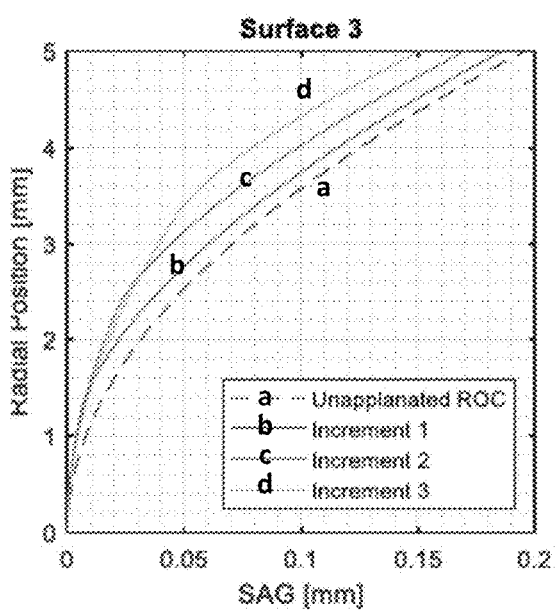
Figure 2D:
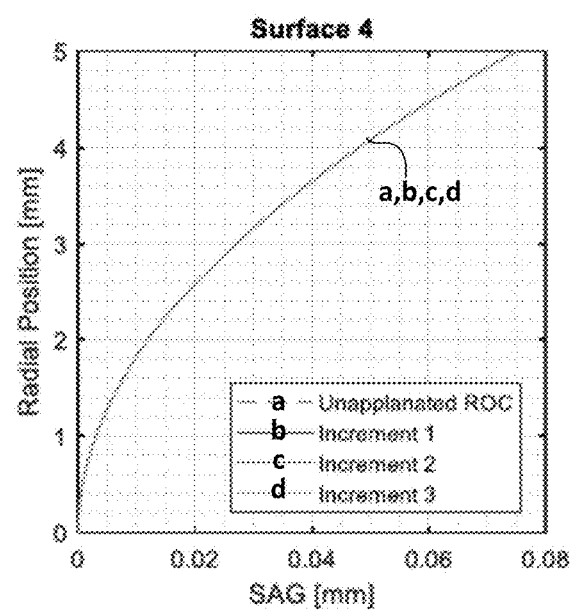

Starting from this initial configuration, in which the two constituent lenslets have only an on-axis-point of contact and are under no stress, the lens system was considered compressed along the axis such that progressively increasing mutual applanation of the surfaces II and III occurred (in the same technical fashion as discussed in U.S. Pat. No. 10,191, 261)—with FIGS. 1A and 1B showing the lens system profiles simulated with the FEA for the unapplanated state (FIG. 1A; there is only one, ingle point P of contact between the two lenslets on the optical axis OA, 104) and the substantially fully compressed (applanated) state of the surfaces II and III, FIG. 1B, in which surfaces II and III are considered to contact each other substantially at any radial point. FIGS. 2A, 2B, 2C, and 2D are plots illustrating changes in surface sag values, as functions of a separation of a particular surface point from the optical axis OA, for the surfaces of such lens system for several progressively-increased levels of applanation. Here, the degree of applanation corresponding to "increment 1" is smaller than the degree of applanation corresponding to "increment 2", and the degree of applanation corresponding to "increment 3" is greater than the degree of applanation corresponding to "increment 2". Table 2 summarizes the wavefront errors (RMS OPD WFE) introduced by the embodiment of the lens system with different degree of applanation of surfaces II, III. The degrees of applanation is represented by levels of axial compression of the constituent lenslets expressed as percent of sag between the surfaces II and III that has been removed by applanation. (The increasing % of compression can be thought of as the increasing area of surfaces II, II that are in contact with one another). Here, the wavefront errors are summarized for a substantially stress-free state of the lens system (0% of compression/applanation), in a substantially fully applanated state (100% of the areas of the surfaces II, II are applanated) and in several intermediate states. It can be observed that, as the degree of applanation is progressively increased, the are-averaged optical power o the lens system is being reduced (due to the flattening of the lenslets) and the corresponding the overall wavefront error figures is being reduced as well due to the reduction of the contribution to such wavefront error of the non-applanated portion of the surfaces of the constituent lenslets.

TABLE 2

| Design 1 | RMS OPD WFE: | Area-Averaged Optical Power: |
|---|---|---|
| 0% Compression (Zemax only): | 0.0028 waves | 10.04 Diopters |
| 10% Compression (Zemax + FEA): | 1.333 waves | 9.04 Diopters |
| 30% Compression (Zemax + FEA): | 12.31 waves | 6.86 Diopters |
| 60% Compression (Zemax + FEA): | 9.44 waves | 4.02 Diopters |
| 100% Compression (Zemax only): | 0.0008 waves | 1.28 Diopters |

Example 2: A Train of Two Lenslets with Mutually-Facing Aspherical Surfaces

For the purposes of demonstration of how the addition of the aspherical term to the spatial profile of the surface of a constituent lenslet of the lens system of Example 1 affects the wavefront error present during the process of increasing the overall focal length of the lens system (which corresponds to the process of increasing applanation of the lenslets; or conversely, during the process of reduction of the focal length of the lens system that corresponding to the process of reduction of the degree of applanation of the lenslets), the modified embodiment of the lens system of Example 1 was considered in that corresponding conic terms were added to the surface profiles of the surface II, II—see Table 3—thereby modifying these surfaces to be optically prolate aspheric surfaces as conventionally understood in the art. By analogy with Table 1, Table 3 addresses a non-stressed (non-applanated) state of the so-modified lens system in which the facing-each other surfaces II and III were in contact with one another at an axial point only.

TABLE 3

| Design 2: Two Lenslets with Aspherical Surfaces | Radius of Curvature: | Surface Profile: | Conic Constant: | $4^{th}$-Order Aspheric Term: |
|---|---|---|---|---|
| Lens 1-Surface I: | 119.177 mm | Convex | 0.000 | 0.000 |
| Lens 1-Surface II: | 785.827 mm | Convex | −0.500 | −2.356E−06 $mm^{-3}$ |
| Lens 2-Surface III: | 63.952 mm | Convex | −0.500 | 2.356E−06 $mm^{-3}$ |
| Lens 2-Surface IV: | 166.640 mm | Concave | 0.000 | 0.000 |

Here, as the lens system undergoes axial compression and the surfaces II, III are increasingly flattened against one another, their surface profiles become more oblate as the surface is flattened at the interface and the asphericity of the surfaces is removed, thereby allowing the system to approach the diffraction-limited performance across a broader range of applanation conditions, as evidenced by the wavefront error figures summarized in Table 4.

TABLE 4

Wavefront Errors and Area-Averaged
Optical Power for Example 2:

| Design 2 | RMS OPD WFE: | Area-Averaged Optical Power: |
|---|---|---|
| 0% Compression (Zemax only): | 0.0032 waves | 10.03 Diopters |
| 10% Compression (Zemax + FEA): | 0.9681 waves | 9.08 Diopters |
| 30% Compression (Zemax + FEA): | 8.9155 waves | 6.86 Diopters |
| 60% Compression (Zemax + FEA): | 7.7089 waves | 3.96 Diopters |
| 100% Compression (Zemax only): | 0.0008 waves | 1.28 iopters |

A skilled artisan will readily appreciate, from the comparison of the results summarized in Tables 2 and 4, that the addition of the prolate aspheric term to the surface profiles of the surfaces II, III of the two-lenslet design substantially reduces the residual wavefront error caused by the incompletely applanated surfaces II, II during the processes of increasing or decreasing the focal length of the lens system. While the wavefront errors are shown only for several discrete degrees of applanation are shown (for the reasons that it is simply impractical to show the very large number of applanation steps), it is appreciated that this tendency and observed trend of reduction of the wavefront error due to configuring the mutually-facing surfaces of the constituent lenslets as prolate aspheric surfaces rather than as substantially spherical surfaces remains potent in general.

Figure 3A:
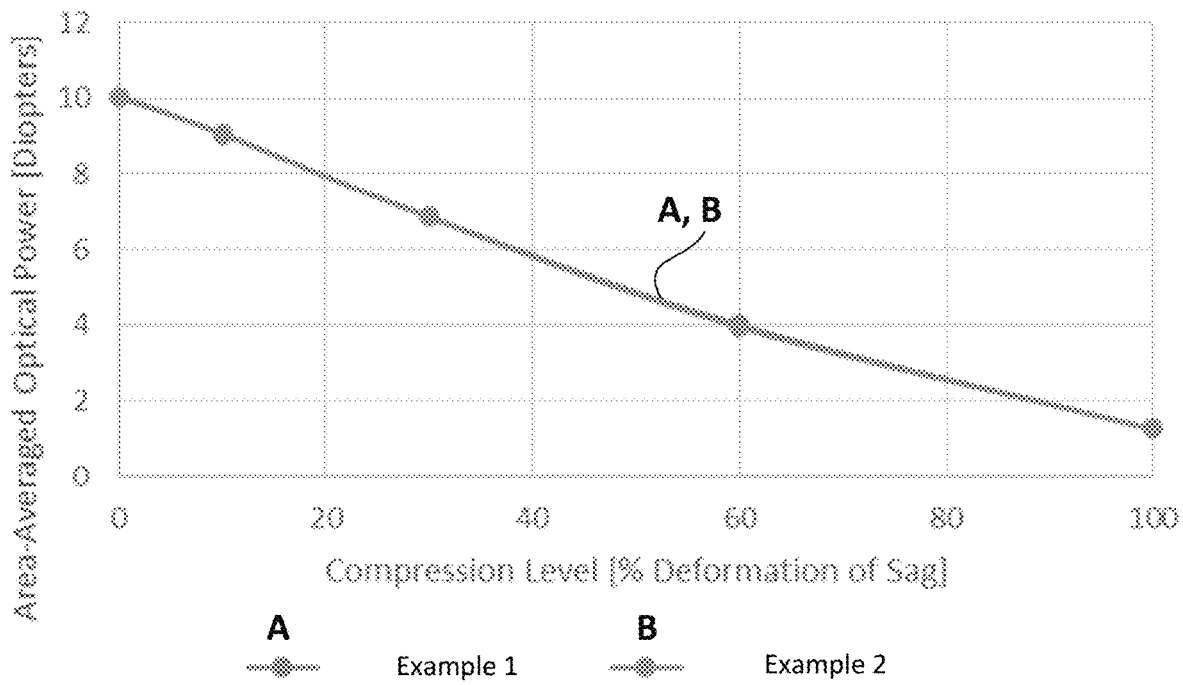
FIG. 3A includes plots showing comparison between the changes introduced into area-averaged optical power by the process of applanation of the mutually-facing surfaces of the lenslet with substantially spherical surfaces with those observed in the case of the lenslets having aspherical surfaces.
Figure 3B:
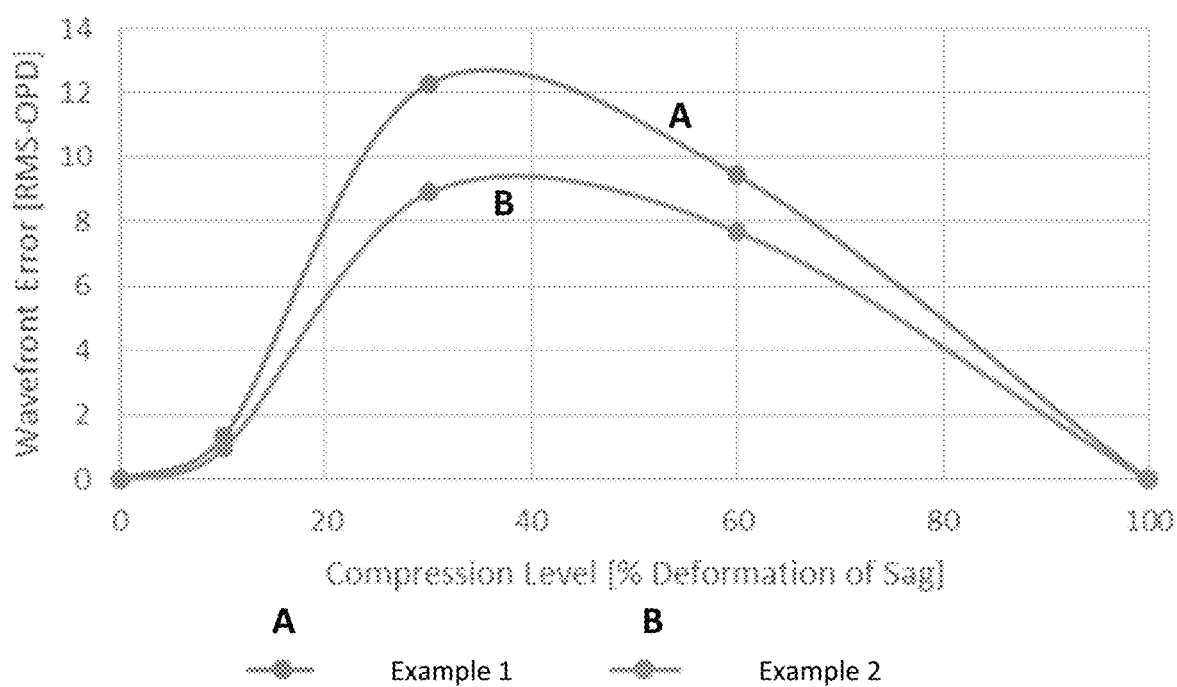
FIG. 3B includes plots showing comparison between the changes in wavefront errors introduced by the same two pairs of lenslets as a function of the same process of applanation.

More insight in advantages provided by the lens system of Example 2 can be gained by comparing the additional details of optical performance of the lens systems of Examples 1 and 2, in reference to FIGS. 3A, 3B and FIGS. 4A, 4B, 4C, and 4D. FIGS. 3A, 3B are plots representing substantially the results summarized in Tables 2, 4. As expected for the design of Example 1, the area-averaged optical power sees a smooth monotonic transition from 10.0-Diopters to 1.25-Diopters as the lens system undergoes compression. The amount of optical aberration is also well within the diffraction-limited regimes in the end-states of being uncompressed and fully compressed. As the design of Example 1 undergoes axial compression (~ applanation of surface II and III), the wavefront aberrations increase and peak at some intermediate amount of compression. Noteworthy is the comparison of the numerical scale of the x-axis of FIGS. 4A through 4D with that of FIGS. 2A though 2D, showing that while addition of the aspheric term to the surfaces II, III in Example 2 practically does not affect the physical profile of the surfaces along the full radius, such addition reduces the amount of wavefront aberration during the focal length transition that the lens system undergoes as a result of being compressed (or, reversely, as a result of compression being removed).

Example 3: A Train of Three Lenslets with Substantially Spherical Surfaces

In this Example, the embodiment of the mechanically-compliant lens system was configured by analogy with the Example 1, except three constituent lenslets were used instead of two. A schematic reference for such easily-visualized configuration is provided by FIGS. 16A, and 16B. Here, the initial pair of lenslets 110, 120 with substantially spherical surfaces is complemented with an auxiliary lenslet 1630.

The immediately-adjoining ones of the lenslets 110, 120, 1630 are shown in physical contact with one another in an unstressed state. In other words, the lenslets 110 and 120 are in contact at the axial points O, O' of the surfaces II and III, and the lenslets 120, 1630 are in contact at the axial points O", O''' of the surface IV and V. The schematic shapes of lenses 110, 120, 1630 in a stressed state (caused by applying an axially-directed force to surface VI towards surface I, while lenslet 110 was fixated in the housing harness) corresponding to the increase of the radii of curvature of the internal surfaces of the constituent lenslets 120, 120, 1630 are shown in FIG. 16B, where the flattened areas of the internal surfaces II, II, IV, and V are schematically and not to scale aggregately marked as 1644. (It is appreciated that an embodiment with more than three sequentially-disposed individual constituent lenslets of the overall lens system would be structured in a substantially similar fashion.)

Figure 16A:
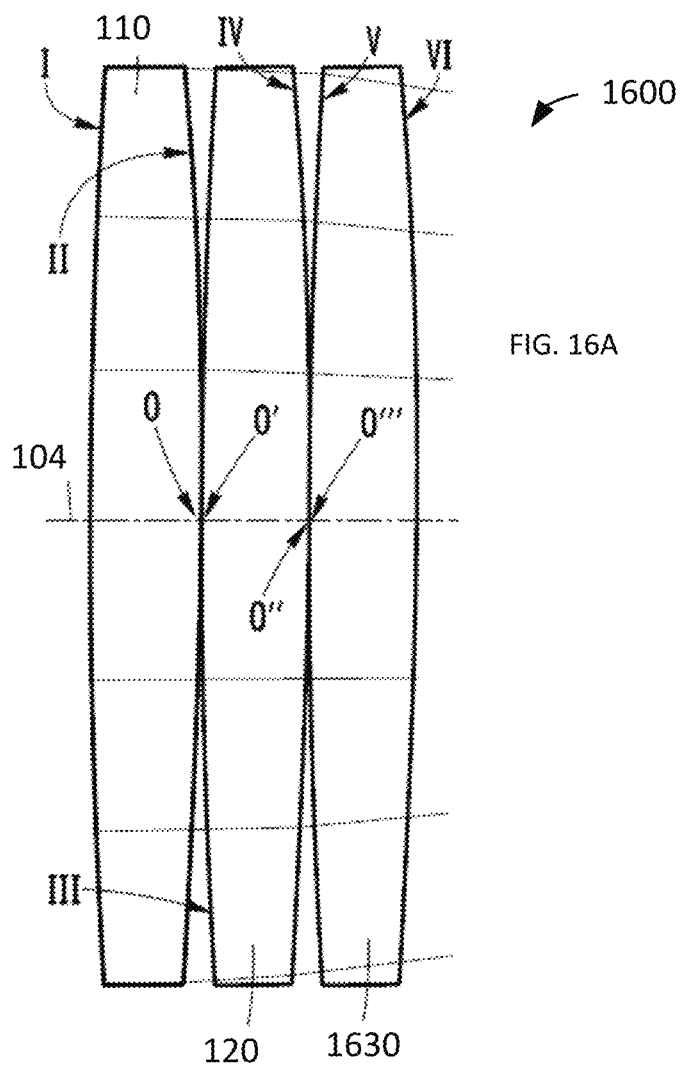
FIGS. 16A, 16B schematically illustrate an embodiments of the lens system that includes three constituent elastically-deformable lenslets.
Figure 16B:
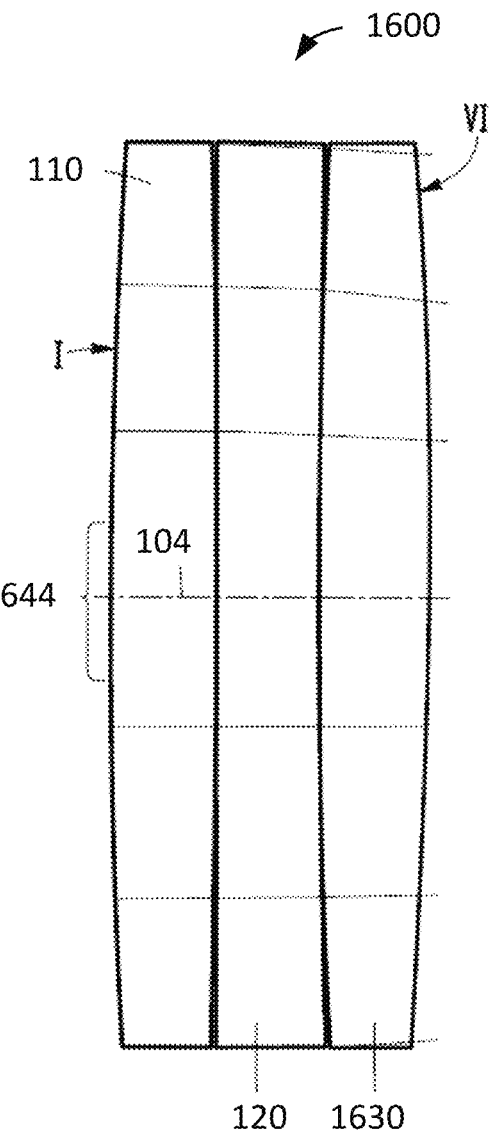

The embodiment of FIGS. 16A, 16B was structured to be diffraction-limited with about 10-Diopters of optical power when non-applanated and diffraction-limited with roughly 1.25-Diopters when substantially fully applanated. However, with the presence of the additional third lenslets allowed for an additional degree-of-freedom in the design, which in this Example manifested in the requirement for the system to be diffraction-limited with a prescribed area-averaged optical power (in this Example-of about 5.71-Diopters) when only one pair of the two pairs of mutually-facing surfaces of the constituent lenslets were fully applanated while the other pair was not. To put it differently, the availability of the more than one pair of the constituent lenslets in this design—that is, a pair of lenslets 110 and 120 in which that mutually-applanating surfaces are surfaces II and III, and a pair of lenslets 120 and 1630 in which the mutually-applanating surfaces are surfaces IV and V-provides not only for the opportunity to reduce the wavefront errors, during the reversible process of applanation of the lens system, due to the increased overall number of constituent lenslets as compared with the Examples 1 and 2, but also for the opportunity to reduce such errors by applanating the mutually-facing surfaces of only every other pair of the present pairs of the constituent lenslets rather than the applanating each and every pair of the mutually-facing surfaces internal to the lens system. Understandably, in practice, in order to control a set amount of compression of only one pair of immediately neighboring lenslets (and, therefore, the applanation of only one pair of the available two pairs of mutually-facing surfaces of constituent lenslets) independently from and without affecting the remaining portion of this lens system, the housing, the mechanism of fixation and/or axial compression of the lenslets should allow for reversible fixation of the middle of the three lenslets. (In related designs, in which the number of constituent lenslets exceeds three, the general approach to achieving applanation of a chosen pair of mutually-facing surfaces independently from applanation of other mutually facing surfaces would follow the same logic.)

TABLE 5 illustrates parameters of the prescription of the lens system
of Example 3 for the non-stressed (non-applanated) state:

| Design 3: Three Lenslets with Spherical Surfaces | Radius of Curvature: | Surface Profile: |
|---|---|---|
| Lenslet 1, 110-Surface I | 82.647 mm | Convex |
| Lenslet 1, 110-Surface II | 355.820 mm | Concave |
| Lenslet 2, 120-Surface III | 87.998 mm | Convex |

TABLE 5-continued illustrates parameters of the prescription of the lens system of Example 3 for the non-stressed (non-applanated) state:

| Design 3: Three Lenslets with Spherical Surfaces | Radius of Curvature: | Surface Profile: |
|---|---|---|
| Lenslet 2, 120-Surface IV | 360.455 mm | Concave |
| Lenslet 3, 1630-Surface V | 87.024 mm | Convex |
| Lenslet 3, 1630-Surface VI | 100.012 mm | Concave |

TABLE 6

Results of simulation of wavefront errors introduced by the lens system of Example 3 for different states of applanation of different pairs of mutually-facing surfaces of constituent lenslets:

| Design 3: Waves RMS OPD @ Image Plane of Min. | | Compression of pair of Lenslet 1 and Lenslet 2 (~applanation of surfaces II, III) | | | | |
|---|---|---|---|---|---|---|
| RMS OPD WFE: | | 0% | 10% | 30% | 60% | 100% |
| Compression of pair Lenslet 2 and Lenslet 3 (~applanation of surfaces IV, V): | 0% | 0.0062 waves | 1.5126 waves | 3.7161 waves | 8.1270 waves | 0.0044 waves |
| | 10% | | 0.9217 waves | 4.1157 waves | 0.3319 waves | 0.4613 waves |
| | 30% | | | 9.1467 waves | 4.9123 waves | 3.5230 waves |
| | 60% | | | | 7.3574 waves | 4.8593 waves |
| | 100% | 0.0044 waves | | | | 0.0032 waves |

TABLE 7

Results of simulation of area-averaged optical power of the lens system of Example 3 for different states of applanation of different pairs of mutually-facing surfaces of constituent lenslets:

| Design 3 Area-Averaged | | Compression of pair of Lenslet 1 and Lenslet 2 (~applanation of surfaces II, III) | | | | |
|---|---|---|---|---|---|---|
| Optical Power: | | 0% | 10% | 30% | 60% | 100% |
| Compression of pair Lenslet 2 and Lenslet 3 (~applanation of surfaces IV, V): | 0% | 10.15 Diopters | 9.88 Diopters | 8.90 Diopters | 7.68 Diopters | 5.71 Diopters |
| | 10% | | 9.20 Diopters | 7.94 Diopters | 6.54 Diopters | 4.75 Diopters |
| | 30% | | | 6.92 Diopters | 5.15 Diopters | 3.15 Diopters |
| | 60% | | | | 3.82 Diopters | 2.28 Diopters |
| | 100% | 5.71 Diopters | | | | 1.25 Diopters |

Notably, as compared with the design of Example 1—the addition of the extra lenslet to the lens system visibly reduces the peak value of wavefront errors. It is understood that, while the design of Example 3 added only one auxiliary constituent lenslet to the overall lens system, the trend and tendency of such modification remains with the addition of more than one constituent lenslets, as shown below by Example 4. Alternatively or in addition, the increase of the number of constituent lenslets can be combined with modification of the spatial profiles of the surfaces of at least one of the pairs of mutually-facing surfaces of the constituent lenslets (as considered in Example 2) to further reduce the wavefront errors during the process of tuning/changing the optical power of the lens system.

Example 4: A Train of Seven Lenslets with Substantially Spherical Surfaces

As the skilled artisan understands now, the idea of increasing the number of constituent lenslets in the overall lens system implies that in a related embodiment multiple auxiliary lenslets can be added to the base system of Example 1 such that the overall optical system includes a set of four or more constituent lenslets each contacting an immediately neighboring constituent lenslet at a corresponding axial point when these four or more constituent lenslets are not under stress.

The embodiment of this Example takes the idea of increasing the number of constituent lenslets in the mechanically-compliant lens system even further to—somewhat arbitrarily—the seven lenslets to demonstrate that the continued increase of the number of lenslets inevitably results in reduction of the wavefront errors during the process of refocusing the lens system (due to the applanation of at least one pair of the mutually-facing surfaces of the constituent lenslets) between the near focus state (corresponding to the situation with no applanation or not stress in the lens system) to the far focus state (corresponding to the situation with substantially full applanation and maximum stress in the lens system). In other words—and while this embodiment in not presented in the Figures—as compared with the embodiment of Example 1, the overall lens system additionally includes a sequence of 5 (five) auxiliary lenslets each contacting an immediately neighboring constituent lenslet at a corresponding axial point when these multiple auxiliary lenslets are not under stress.

The septuplet (7 lenslet) model of the lens system of this Example was designed with the same philosophy as that of Examples 1 and 4: in the unstress state, the mutually-facing each other surfaces of the immediately neighboring lenslets are at contact with one another only at the axial points along the optical axis. Each of the optical surfaces was assumed to be a spherical surface. The parameters of the septuplet range from 1.25 Diopters when the lens system of fully compressed to 10.0 Diopters when the lens system has no stress. Here, the assumption of the sequential compression of the different pairs of mutually-facing surfaces or interfaces between the immediately-neighboring lenslets (already considered in Example 4) was maintained, the surface radii-of-curvature were chosen such that the optical power of the overall lens system was advanced in equal steps throughout the applanation process, interface-by-interface. Here, for simplicity, we started by making all surfaces substantially planar (~ fully applanated lens system) and then carried out a radius-of-curvature (ROC) solutions for the first and last surfaces (surface I and XIV) with overall system power of 1.25 Diopters. The ROC values for the surfaces I and XIV were then locked. Then, parameters of the mutually-facing surfaces of the last pair of lenslets (last internal interface; surfaces XII and XIII of lenslets 6 and 7) were considered to be variables and solutions for the overall system powers of 1.25 D and 1.46 D were obtained. The process was continued until ROCs for all 14 surfaces of the lens system were determined. The resultant septuplet is described in Table 8.

TABLE 8 parameters of the prescription of the lens system of
Example 4 for the non-stressed (non-applanated) state.

| Design 4:<br>Lenslet | ROC of the front surface<br>of the lenslet | ROC of the back surface<br>of the lenslet |
|---|---|---|
| 1 | +49.789 mm (surface I) | +125.930 mm (surface II) |
| 2 | +94.151 mm (surface III) | +154.087 mm (surface IV) |
| 3 | +108.317 mm (surface V) | +121.742 mm (surface VI) |
| 4 | +90.406 mm (surface VII) | +121.014 mm (surface VIII) |
| 5 | +89.739 mm (surface IX) | +117.715 mm (surface X) |
| 6 | +87.157 mm (surface XI) | +115.388 mm (surface XII) |
| 7 | +85.091 mm (surface XIII) | +49.790 mm (surface XIV) |

TABLE 9

Results of simulation (in Zemax) of wavefront errors
introduced by the lens system of Example 4 for
different states of applanation of different pairs of
mutually-facing surfaces of constituent lenslets:

| Design 4: Applanation State | RMS<br>OPD WFE: | Optical<br>Power: |
|---|---|---|
| None of mutually-facing surfaces is applanated | 0.0149 waves | 1.25 Diopters |
| All pairs of mutually-facing surfaces are fully applanated except for those of lenslets 2-7 | 0.0138 waves | 2.71 Diopters |
| All pairs of mutually-facing surfaces fully applanated except for those of lenslets 3-7 | 0.0129 waves | 4.17 Diopters |
| All pairs of mutually-facing surfaces fully applanated except for those of lenslets 4-7 | 0.0119 waves | 5.63 Diopters |
| All pairs of mutually-facing surfaces fully applanated except for those of lenslets 5-7 | 0.0108 waves | 7.09 Diopters |
| All pairs of mutually-facing surfaces fully applanated except for those of lenslets 2-7 | 0.0093 waves | 8.55 Diopters |
| All pairs of mutually-facing surfaces fully applanated | 0.0073 waves | 10.01 Diopters |

Compressing/applanating each of the pairs of mutually-facing surface of the lenslets through the three test levels (10%, 30%, and 60% displacements, as in Examples 1 and 3) with the use of the FEA would result in 18 different simulations. To reduce the number of simulations, only one pair of constituent lenslets of this design was considered. Then, this pair was transitioned through the similar FEA compression analysis as that of Examples 1 and 3, and the RMS-OPD-WFE figures were approximated through the other compression stages with this profile. For the sake of example, the combination of lenslets 1 and 2 was chosen.

TABLE 10

Parameters of lenslets 1 and 2 chosen to represent various
pairs of internal lenslets of the lens system of Example 4:

| | ROC of front surface<br>of the lenslet | ROC of the rear surface<br>of the lenslet |
|---|---|---|
| Lenslet 1 | +90.406 mm (surface I) | +121.014 mm (surface II) |
| Lenslet 2 | +90.406 mm (surface III) | +121.014 mm (surface IV) |
| | Unapplanated: | Fully Applanated: |
| Effective Focal Length: | 335.715 mm | 652.912 mm |
| Optical Power: | 2.98 D | 1.53 D |
| RMS-OPD-WFE: | 0.0028 waves | 0.0018 waves |

At the following step, the FEA was conducted for three intermediate levels of compression of the pair lenslet 1/lenslet 2 (10%, 30%, 60% by displacement of total surface sag, corresponding to three levels of applanation of the surfaces II and III of these lenslets). Table 11 shows quantitative results of the FEA of the interface between surfaces II and III.

TABLE 11

| Single Two-Lenslet Pair<br>(lenslets 1 and 2) of a Septuplet<br>Lens System of Example 4: | RMS OPD: | Area-<br>Averaged<br>Optical<br>Power: |
|---|---|---|
| 0% Compression (Zemax only): | 0.0028 waves | 2.98 Diopters |
| 10% Compression (Zemax + FEA): | 0.1749 waves | 2.58 Diopters |
| 30% Compression (Zemax + FEA): | 1.5937 waves | 2.48 Diopters |
| 60% Compression (Zemax + FEA): | 1.7461 waves | 1.83 Diopters |
| 100% Compression (Zemax only): | 0.0018 waves | 1.53 iopters |

Figure 6:
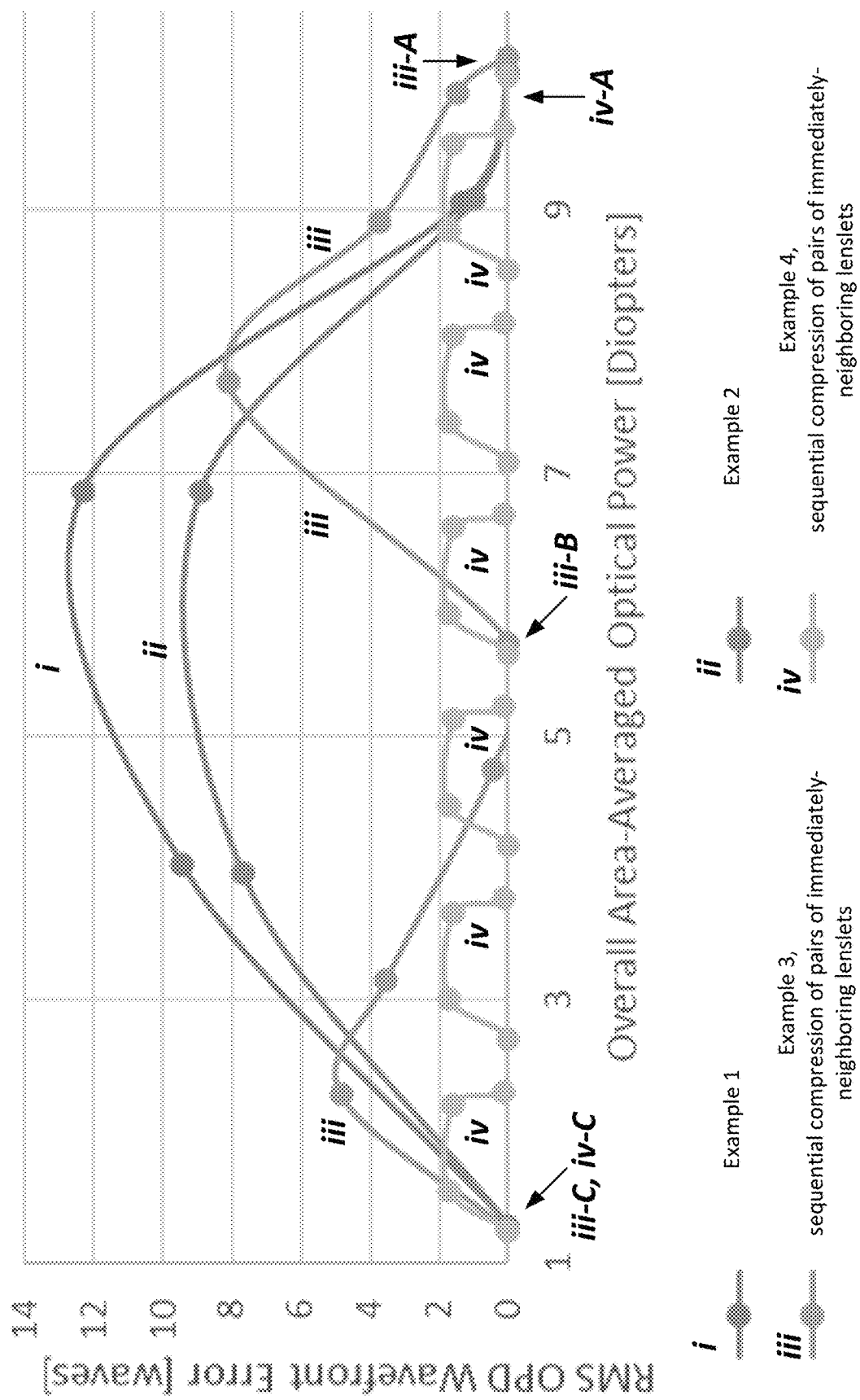
FIG. 6 contains demonstrates comparison of the changes in wavefront errors corresponding to changes in area-averages optical power among different embodiments of the lens system discussed in this disclosure.

Having the results/demonstrations of several discrete Examples 1 through 4 of the lens system demonstrating not only different numbers of constituent lenslets but only the intentional deviation of the surface profile of the mutually-facing surfaces of the immediately neighboring lenslets, introduced to reduce the wavefront errors, the skilled artisan is now in a position to generalize the comparison among the considered designs to arrive at the plots of FIG. 6. Here, in order to produce 2D plots, a sequential interface-by-interface compression scheme was assumed for the embodiments of Examples 3 and 4.

Embodiments of the invention convincingly show that increasing the number of lenslets in an embodiment of the compliant lens system reduces the peak value of wavefront errors (as compared with that of the lens system having a smaller number of constituent lenslets) introduced by the lens system during the process of refocusing between the near and far focus states as a result of compressing at least a pair of the constituent lenslets to applanate the mutually-facing surfaces of such pair of lenslets. Plot iii, for example, represents the changes of the wavefront error as the system 1600 of FIGS. 16A, 16B is applanated in two main sequential steps. First, only one pair of the immediately-neighboring constituent lenslets (for example, the pair 110, 120) is being applanated, which corresponds to the reduction of the initial optical power of the un-applanated system 1600 from that corresponding to point iii-A of the plot iii to that corresponding to point iii-B of plot iii. Upon this first stage of applanation, the wavefront error is first increased to the value corresponding to the first "peak" of the plot iii and then is reduced to substantially zero (at point iii-B). Then, the pair 120, 1630 of the constituent lenslets is being applanated to flatten the contact areas at surfaces IV, V-which corresponds to further reduction of optical power of the overall system 1600 from that corresponding to point iii-B of the plot iii to that corresponding to point iii-C of plot iii. The variation of the wavefront error at this stage of applanation of the system 1600 also undergoes the initial increase (the second peak of the plot iii) and the following reduction (at the ending point iii-C).

Similarly, upon the sequential application of the system of Example 4 (conducted not at the same time for all pairs of immediately-neighboring lenslets by rather pair-by-pair), the optical power of the system of Example 4 is reduced from the value corresponding to the initial optical power (of an unapplanated system, point iv-A of plot iv) all the way to value corresponding to the situation when all pairs of facing-each-other surfaces of constituent lenslets are substantially fully applanated (see point iv-C). As evidenced by multiple "peaks" of the portions of the plots iii and iv and "gaps" between these portions of the plots iii and iv (within which gaps the wavefront error values are reduced to minimal values), the unapplanated surfaces of the corresponding lens systems in the rest (no stress) state can be designed such that a given N-lenslet system (N>2) has multiple null compression (applanation) states with minimal wavefront errors. These null states correspond to cases when interfaces are either uncompressed or fully applanated (when assuming the sequential compression scheme). Alternatively or in addition, the spatial profile of the mutually-applanting and facing each other surfaces of the constituent lenslets can be modified to introduce a prolate aspheric profile in the axial portion of such surface to further reduce the wavefront error(s).

Figure 7A:
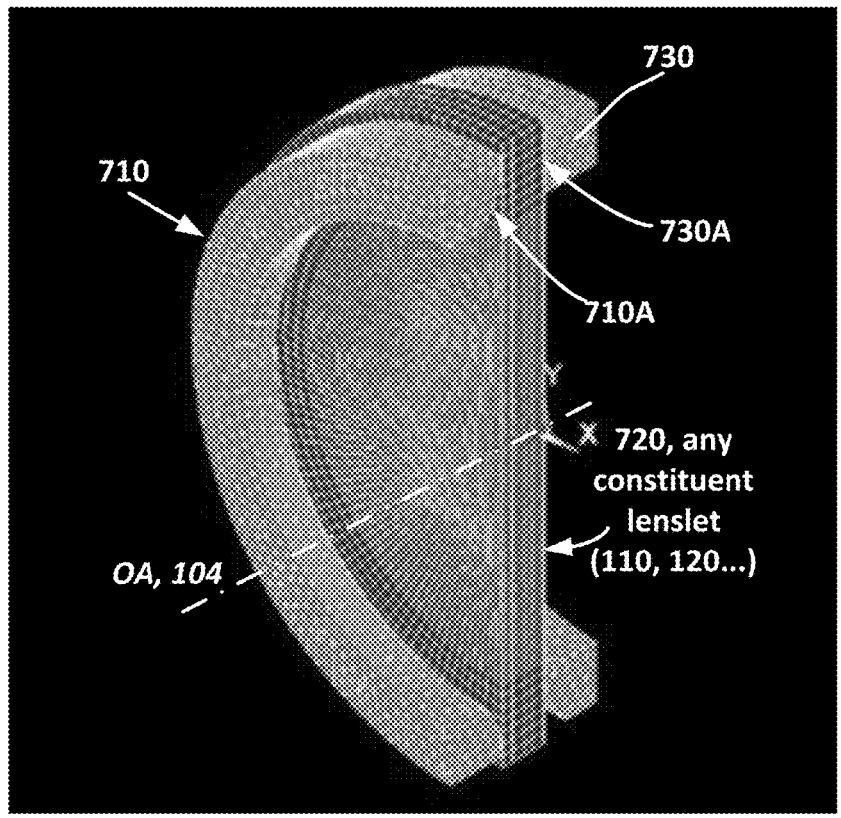
FIGS. 7A, 7B schematically illustrate the principle of bending a lenslet of an embodiment of the lens system of the invention with the use of a supporting ring-like structure external to the lenslet (FIG. 7A) and the distribution of stress throughout the lenslet corresponding to such bending (FIG. 7B). In this embodiment, the process of bending of the lenslet is substantially operationally independent from the process of applanation of the lenslet.
Figure 7B:
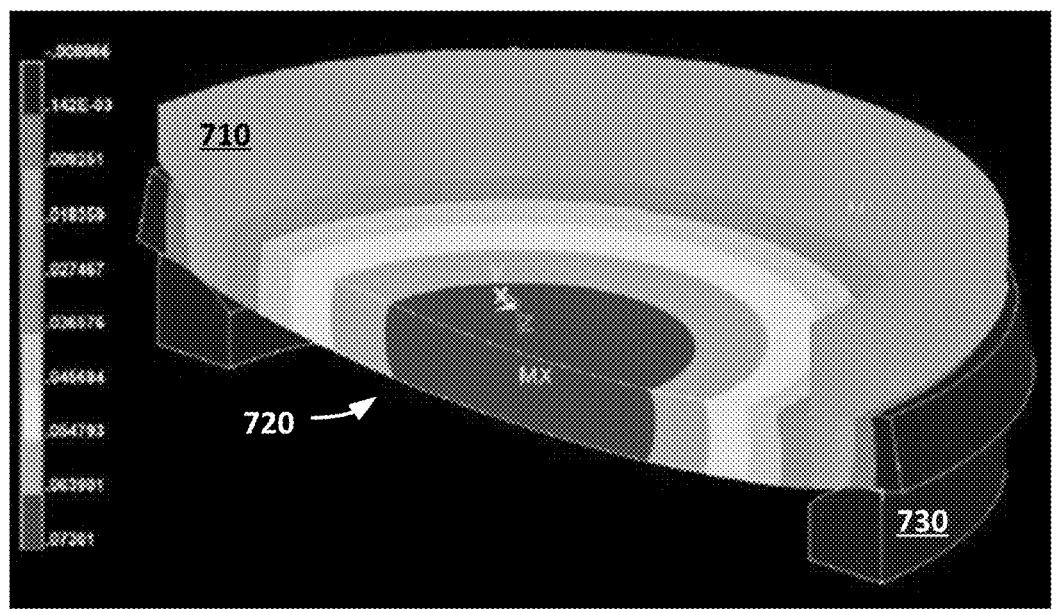

Example 5: A Multi-Lenslet Lens System Subject to Torque Applied to the Edge of a Lenslet to Bend Such Lenslet In the related embodiment, the implementation of which can be combined with any of the embodiments of the previous Examples, at least one lenslet of the multi-lenslet lens system subject to refocusing by applanation of the internal surface(s) of such lens system is appropriately harnessed or configured to enable the user to apply a moment/torque to the circumferential edge portion of the lenslet to bend this lenslet either contemporaneously with the process of refocusing of the lens system or prior to such refocusing or immediately after a certain degree of refocusing has been already implemented. FIGS. 7A, 7B present schematics of a portion of an embodiment 710 of an edge moment actuator (generally configured as a bearing and—in this example—as a push ring element) in contact with the circumferential portion of a given lenslet 720 of the overall lens system that is contained/housed in the support structure a portion of which is shown as 730. For simplicity of illustration, only one half of the overall contraption is indicated, with the push ring 710 having a diameter that is smaller than the diameter of the support structure element 730. The area or region of contact between the push ring element 710 and the lenslet 720 is shown as 710A, while the area or regions of contact between the lenslet supporting element 730 and the lenslet 720 is shown as 730A. (In this configuration, understandably, contact regions 710A and 730A have substantially annular shapes.) The regions of contact 710A, 730B are located at different radial positions with respect to the optical axis 104.

FIG. 7B illustrates the spatial distribution of bending stress throughout the lenslet 720 when the push ring 710 is axially repositioned towards the support structure 730 that remains substantially fixed, thereby indicating the mechanical load applied to the lenslet 720. In FIG. 7B, the contraption of FIG. 7A is shown rotates by 90 degrees. (It is appreciated that in a related embodiment, the element 730 can be configured as part of the edge moment actuator while the element 710 can be configured as part of the lenslet support structure—the principle of application of the torque to the circumference of at least one of the lenslets of the overall lens system does not change regardless of the specifics of a particular implementation of the edge moment actuator.)

Accordingly, an embodiment of the invention includes an optical system at least one of lenslet support elements of which has corresponding first and second contacting areas or regions cooperated with the respectively supported lenslet of the optical system at two respective different radial positions. Such first and second contacting areas are preferably coupled mechanically with one another to transfer force applied to at least one of these areas onto of the lenslet to reversibly shift at least a portion of a circumferential edge of the lenslet along the optical axis while substantially not affecting an axial position of a center of the lenslet.

Figure 8B:
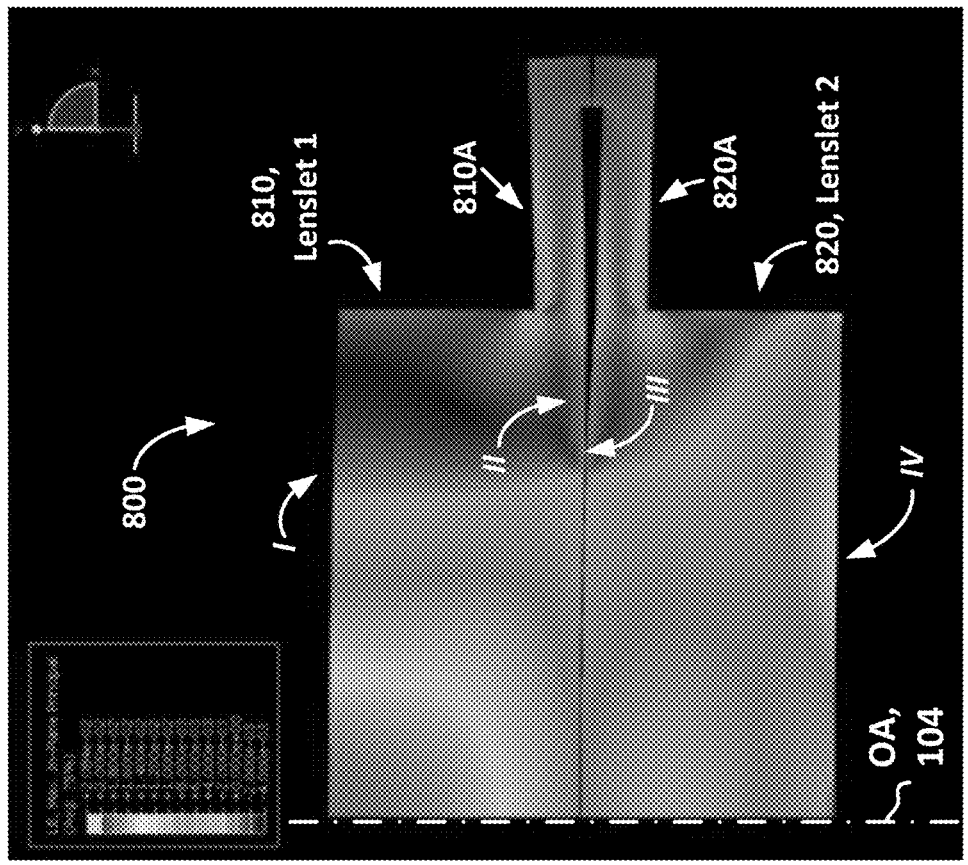
FIGS. 8A, 8B schematically illustrate the principle of bending lenslet(s) of an embodiment of the lens system with the use of structural figure-like feature(s) of the lenslet(s) (FIG. 8B) in comparison with the lenslets that are devoid of such structural features. In this embodiment, the process of bending is substantially contemporaneous with and driven by the process of applanation of the lenslet(s).
Figure 8A:
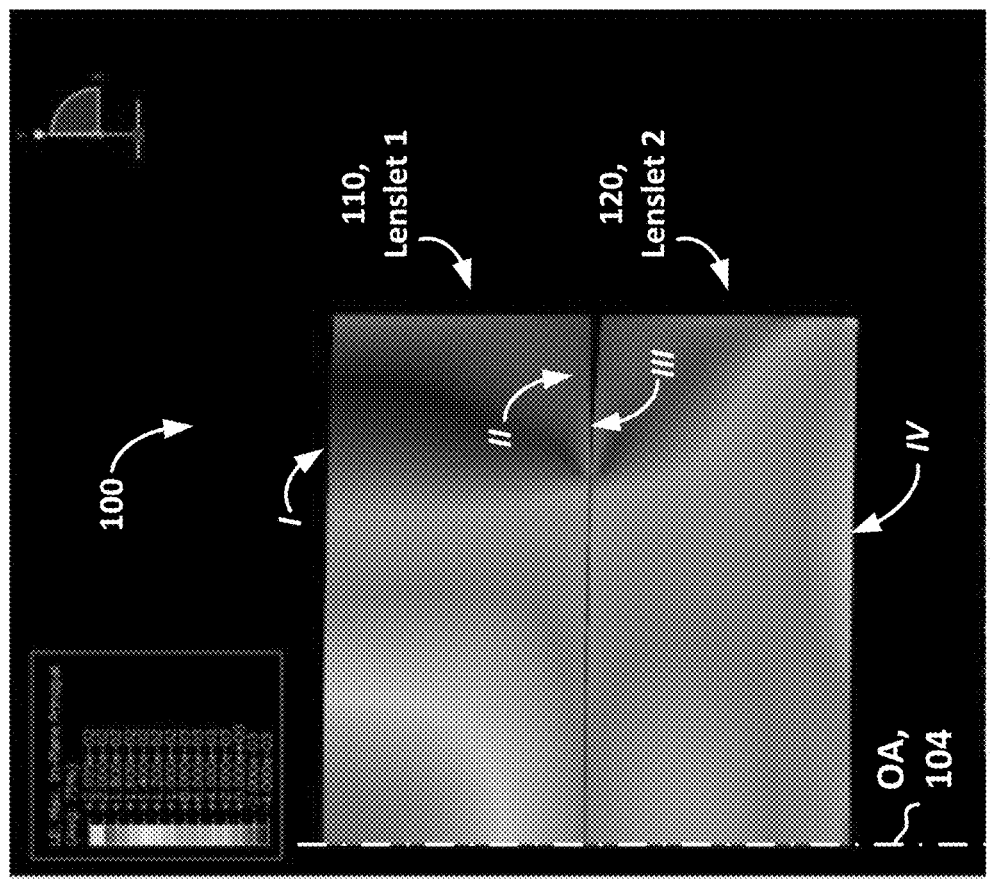
Figure 9A:
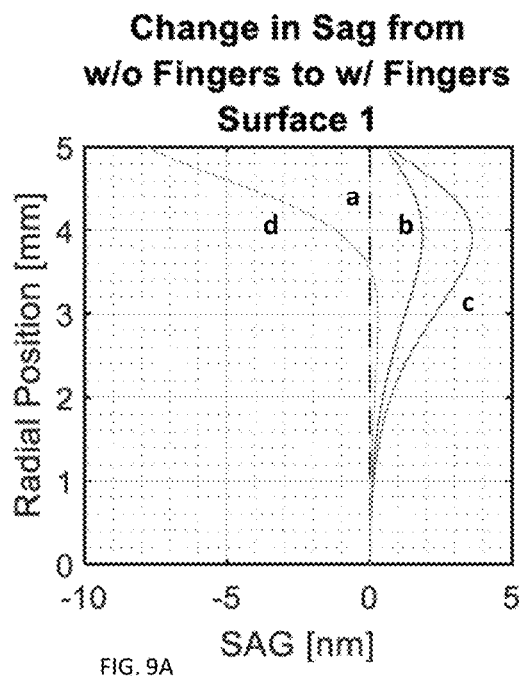
FIGS. 9A, 9B, 9C, and 9D schematically illustrate changes in the surface sag profiles corresponding to different increments/degrees of axial compression (and therefore different degrees of applanation) of the lenslets possessing figure-like haptics and configured according to the embodiment of FIG. 8B as compared with the changes in surface sag profiles of the lenslets 110, 120 that are devoid of the circumferential torque-inducing figure-like haptics and configured according to the embodiment of FIG. 8A.
Figure 9B:
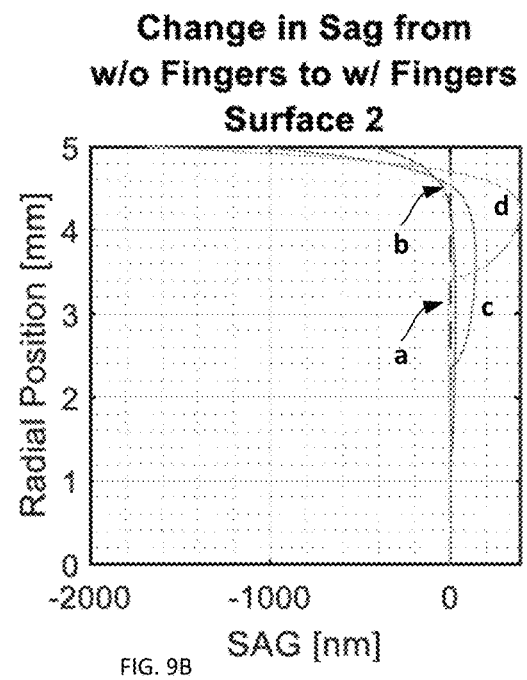
Figure 9C:
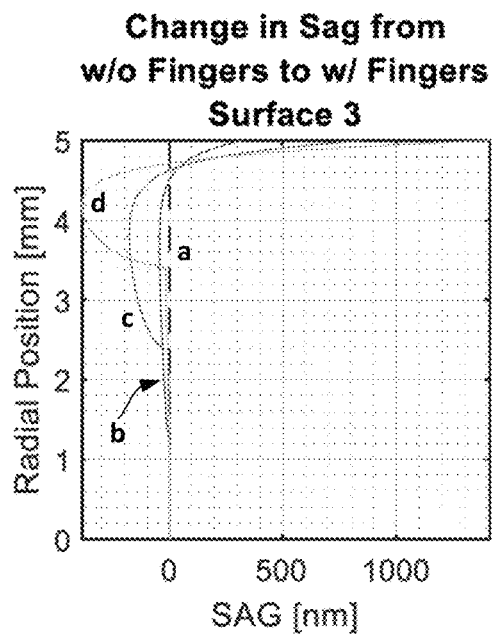
Figure 9D:
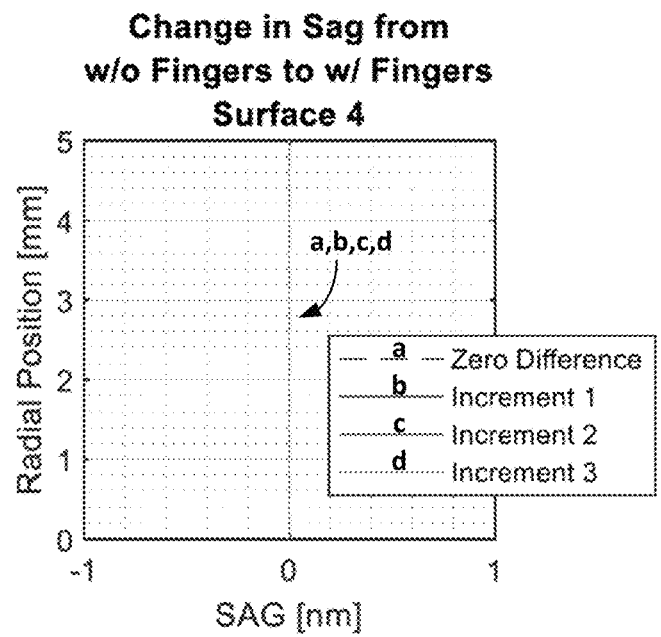

Similarly, FIGS. 8A and 8B schematically illustrate, respectively, in a cross-sectional fashion, the example of the pair 100 of lenslets 110 and 120, as part of the overall lens system, the surfaces II and III of which are partially applanated and, for comparison, the structurally-modified pair 800 of lenslets 810, 820 that are otherwise substantially optical identical to the lenslets 810, 820, respectively. As shown in FIG. 8B in comparison with FIG. 8A, the lenslets 810, 820 now possess moment-inducing extensions or "fingers" or haptics 810A, 820A dimensioned such that the facing each other ends of the haptics (which are normally in contact with one another in the steady-state or no-stress configuration when no applanation of any of the lenslets 810, 820 has occurred yet) push against one another when the axially directed force is applied to at least one of the lenslets 810, 820 to refocus the pair 800, thereby creating a torque applied to the circumference of at least one of the lenlets 810, 820 and bending at least one of the lenslets 810, 820. Such bending effect is produced by shifting at least a part of the circumferential region (circumferential edge) of at least one of these lenslets along the optical axis while substantially not affecting an axial position of a center of the lenslet being bent.

Understandably, in order to provide for optimal application of torque to the lenslet(s), the haptics 810A, 820A may be optionally structured to be rotationally-symmetric with respect to the optical axis 104. For example, in a least one case the haptics 810A, 820A may be dimensioned—as viewed along the optical axis 104—as rings or bands having substantially annular shapes. In this specific embodiment, each of the haptics 810A, 820A has a corresponding inner perimeter along which the respective haptic is attached to a circumferential edge of corresponding lenslet (810 or 820).

FIGS. 9A, 9B, 9C, and 9D schematically illustrate changes in the surface sag profiles corresponding to different increments of axial compression a, b, c, and d (~ different degrees of applanation) of the lenslets 810, 820 as compared with the surface sag profiles of the lenslets 110, 120 that are devoid of the circumferential torque-inducing haptics/"fingers". Comparison between the corresponding plots of FIGS. 9A through 9D with those of FIGS. 4A through 4D illustrates the differences attributed to the presence of the circumferential torque applied to the lenslets of Example 5.

Figure 10A:
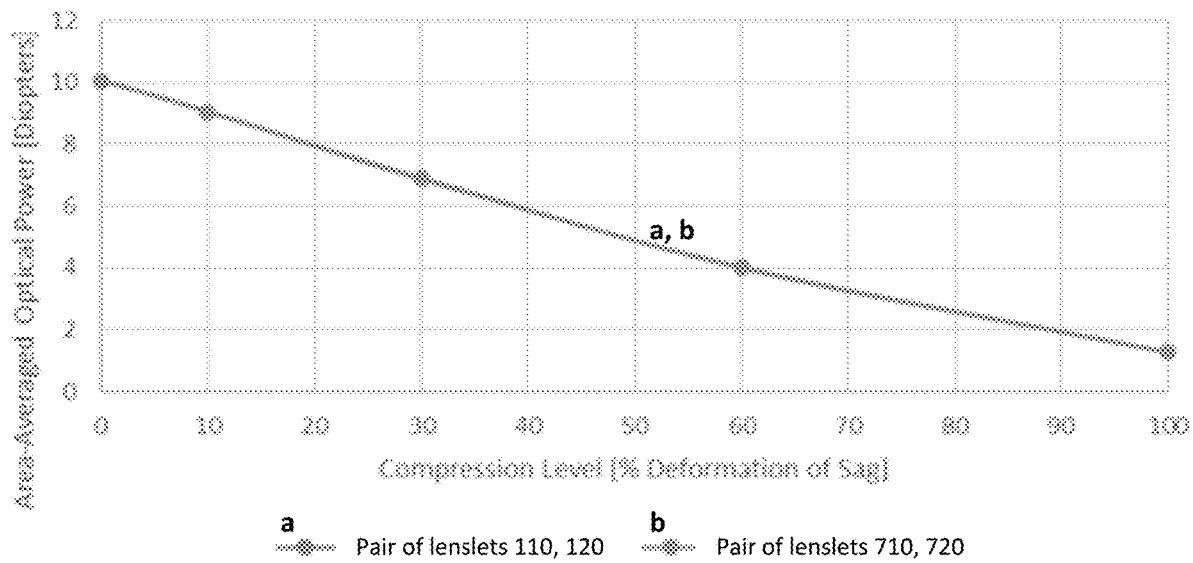
FIGS. 10A, 10B provide plots illustrating, respectively, the change in optical powers of the pairs of the contacting one another lenslets of the overall lens system and the resulting wavefront errors introduced by such pair as a function of a degree of applanation of the facing each other surfaces, for embodiments of FIGS. 8A and 8B, respectively.
Figure 10B:
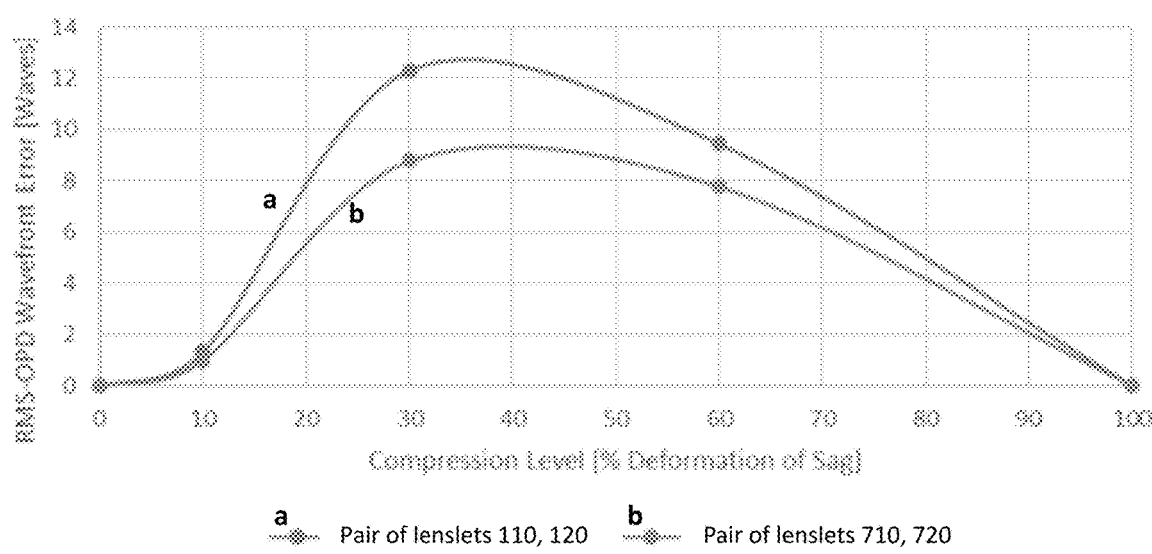
Figure 11E:
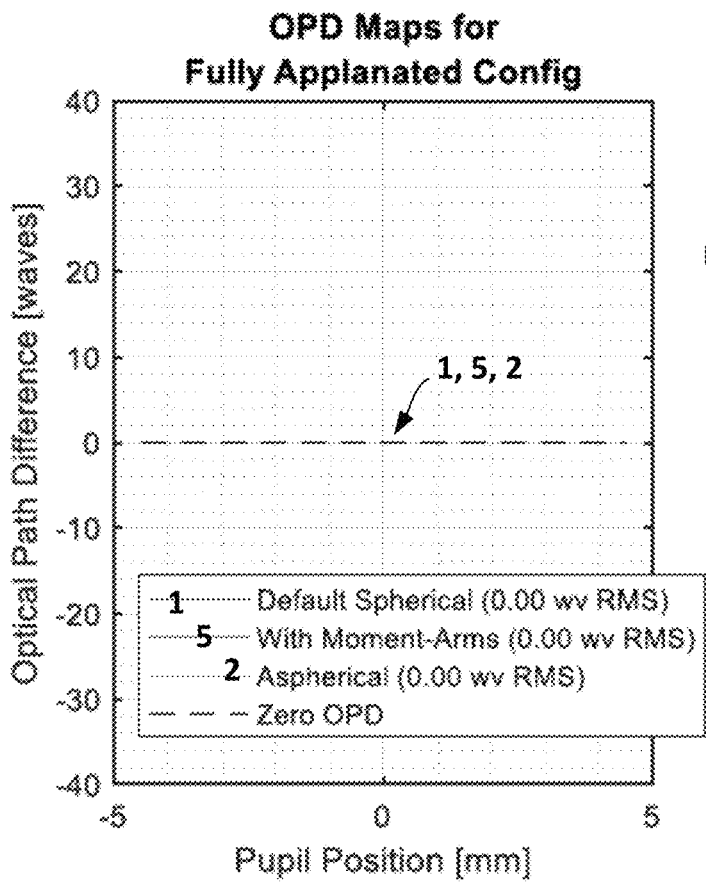

FIGS. 10A, 10B provide plots illustrating, respectively, the change in optical powers of the pairs of the contacting one another lenslets of the overall lens system and the resulting wavefront errors introduced by such pair as a function of a degree of applanation of the facing each other surfaces (surfaces II and III in the case of pairs (110, 120) and (810, 820)). The skilled person will readily appreciate that the employment of the circumferential torque applied to the lenslet(s) in conjunction with the applanation-based process of refocusing of the pair of lenslets leads to reduction of the wavefront errors.

Comparison among the optical path difference (OPD) fans—depicted, in FIGS. 11A, 11B, 11C, 11D, and 11E as known in the art—for the embodiments of Examples 1, 2, and 5 (the latter representing the embodiment of Example 1 modified structurally to include the moment-inducing haptics/extensions 810A, 820A, per FIG. 8B) illustrates the manifestation of reduction of wavefront errors (for different degrees of applanation of the surfaces II, III of the constituent lenslets of these Examples) manifests in changes of the OPD fans. Here, the following short-hand notation is used: 1=Example 1; 2=Example 2; 5=Example 5.

According to the idea of the invention, the torque can be applied to the circumferential edge of a lenslet of the lens system at at least one—and preferably multiple-points or portions of the edge, and/or the application of such torque is effectuated either prior to or, preferably, simultaneously with, or after the implementation of incremental applanation of a portion of the corresponding lens system (and regardless of the number of lenslets in the lens system and regardless of whether the surfaces being applanated are aspheric or substantially spherical).

Example 6: Reduction of Wavefront Errors Introduced During Refocusing of an Embodiment of a Multi-Lenslet Lens System by Transverse Loading of a Constituent Lenslet The illustration to this embodiment of the invention is provided on the example of a portion of the lens system that includes two constituent lenslets that are in a non-stress state (steady state, no axially-directed surface-applanating force present) are in contact with one another at an axial points of the facing each other surfaces II, III, similar to that shown in FIG. 1A. At least one of the lenslets 110, 120 is then subjected to transverse load modeled as a radial displacement of at least one specified portion of the perimeter/circumferential edge of the lenslet—and, in a related embodiment—the opposing portions of the perimeter of the lenslet. In practice, various radial displacements of interest may be implemented with a radial loader device (which may be configured as a bearing) device that is attached to a circumferential edge/outer perimeter of the lenslet subject to transverse loading to apply radially-directed force to such circumferential edge. The radial loader device is not expressly shown in FIG. 12 but is referred to as 1210, may be is part of the overall support structure of the lens system and may be arranged to be movably supported between an inner loader position and an outer loader position. (The inner loader position may be defined at a first radial distance from the optical axis and the outer loader position may be defined at a second radial distance from the optical axis. Here, the second radial distance is larger than the first radial distance.) Notably, both the radial loader device and the transverse loading caused by the operation of such loader device are different from the structure of haptics of the intra-ocular lens (IOL) discussed in, for example, PCT/US2014/0580318 and the effects caused by operations of such haptics, as the radially-directed force applied to the IOL by operation of the haptics provides for disadvantageous additional increase of the axial force due to the specific shape of the haptics.

Figure 12:
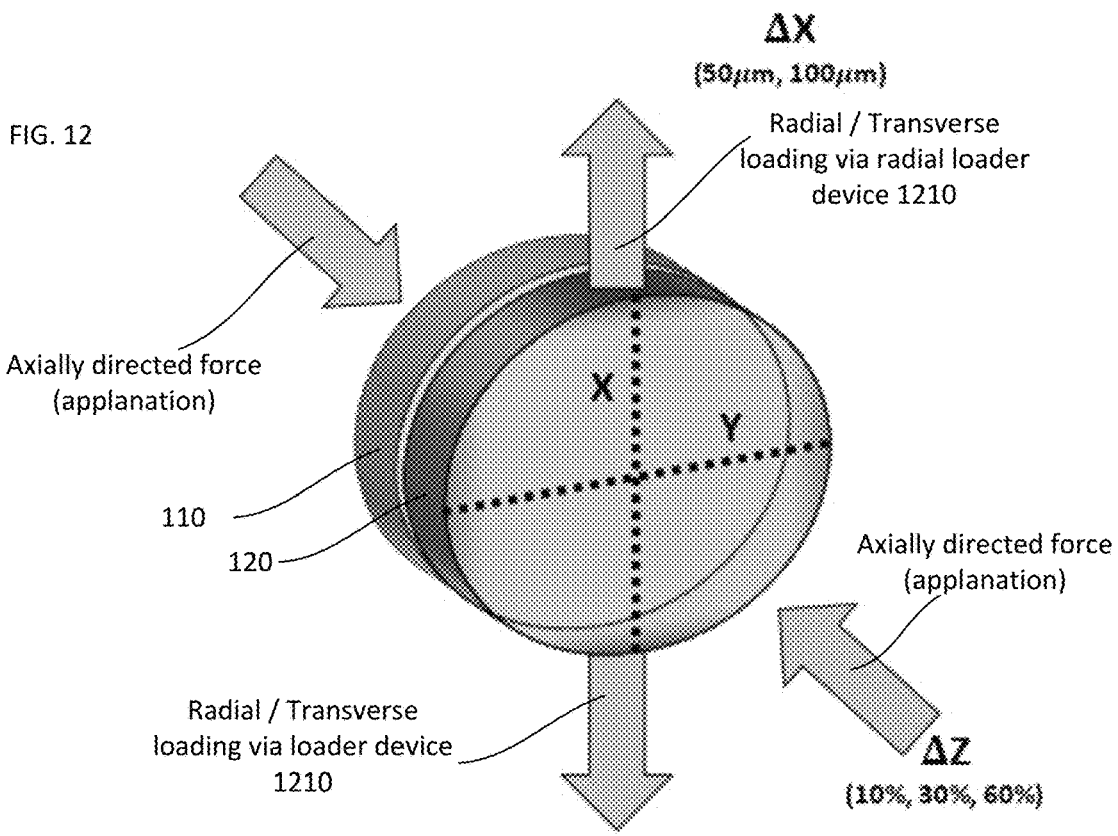
FIG. 12 illustrates schematically a principle of applying (whether radially as shown or anti-radially) an external force to a perimeter of a chosen lenslet of the pair of lenslets of the optical system prior to, during, or after the incremental change of the optical power of the pair caused by application of external force to at least one of the lenslets along the optical axis.
Figure 13A:
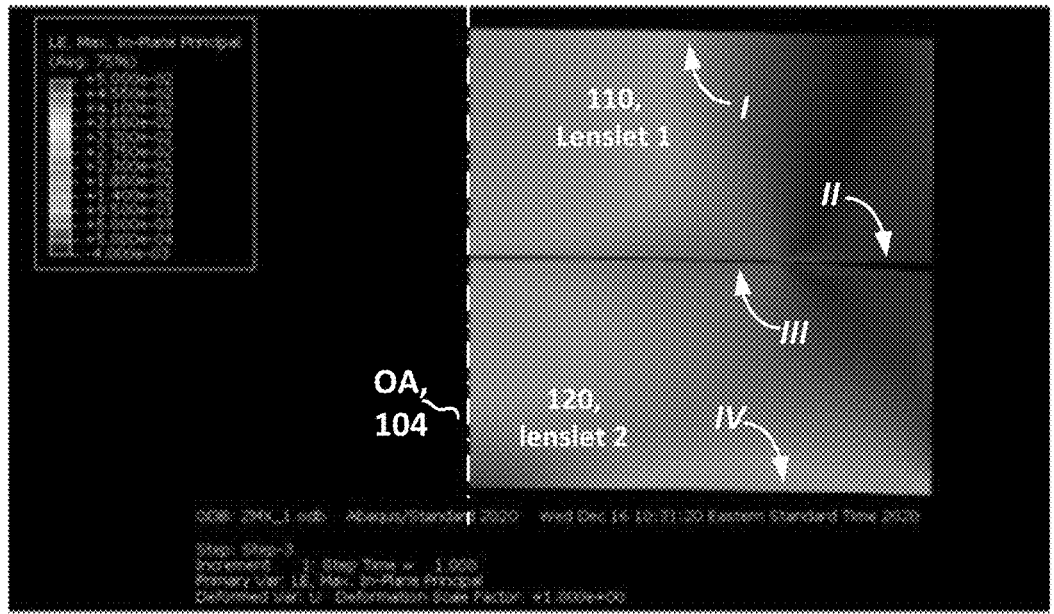
FIGS. 13A, 13B, 13C, and 13D show maps representing the results of the simulation of the specified axial compression of an example of the pair of the lenslets with the Abaqus FEA software in different transverse loading situations.
Figure 13B:
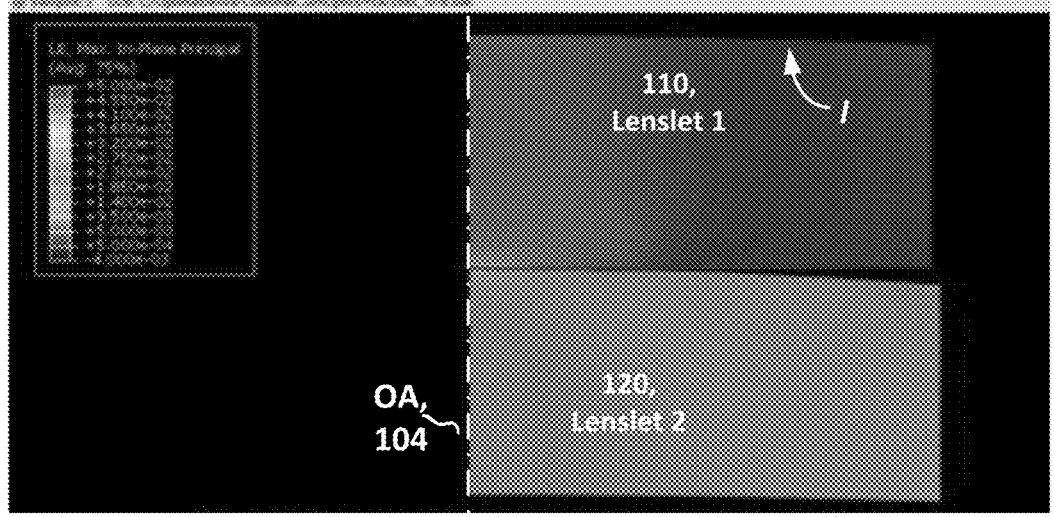
Figure 13C:
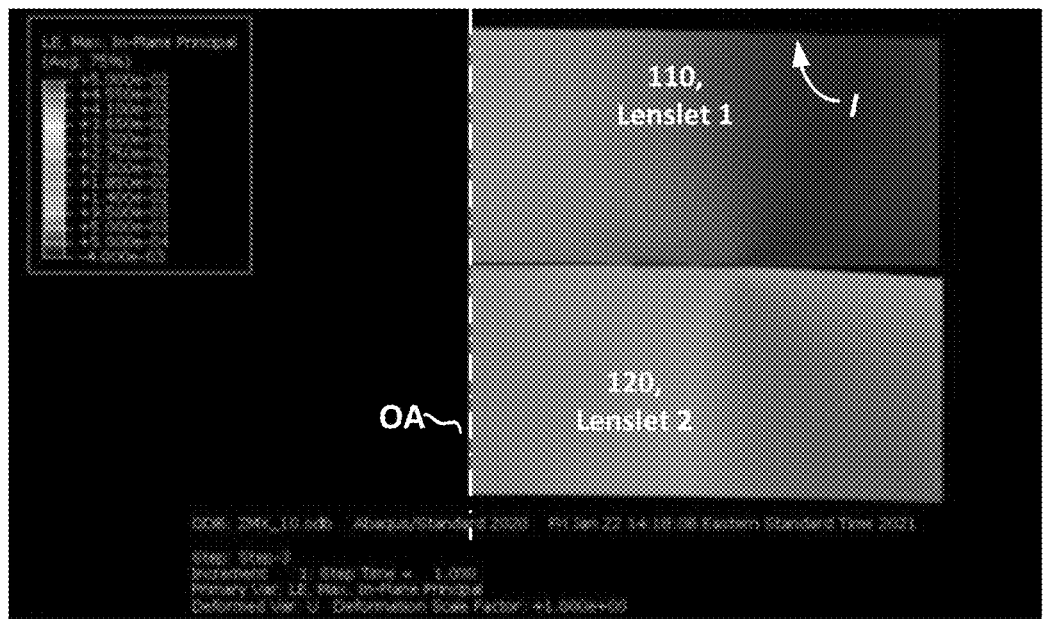
Figure 13D:
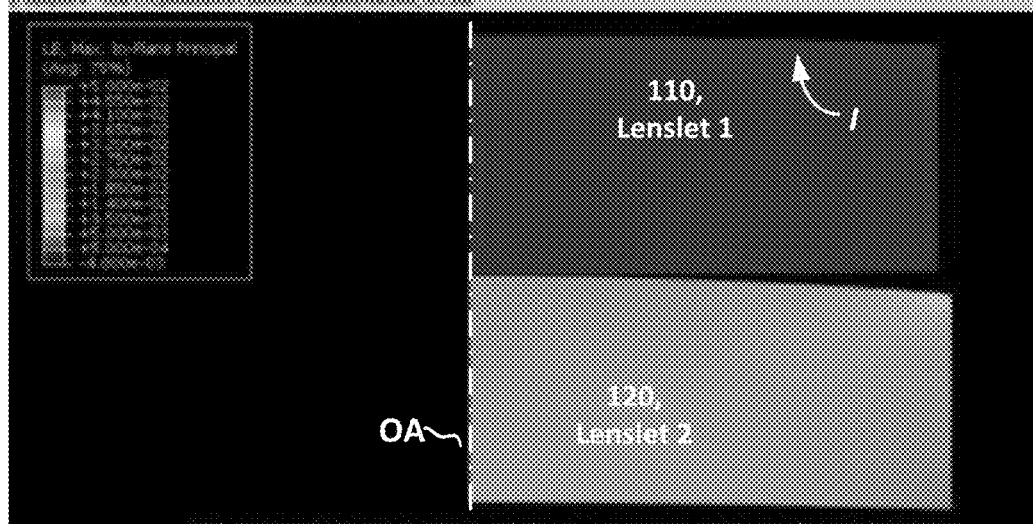

The radial displacements of the edge of the lenslet caused by the applied transverse load are shown along the x-axis, of 50 microns, and then of 100 microns 100 microns, in the specific example of the embodiment of FIG. 12. In this example, substantially simultaneously with such diametrical stretching of a lenslet of the pair 110, 120, the pair 110, 120 is axially compressed (just as discussed in other Examples) to the levels resulting in 10%, 30%, and 60% of the sag of the total interface between the surfaces II and III of the lenslets 110, 120. The sag profiles of the surfaces of the lenslets was simulated with Abaqus FEA software along the x-axis (for one quarter of the lens elements only, to reduce simulation complexity). The surface sag profile in the orthogonal direction (along y-axis) was assumed to be the same as that in absence of the radial load along the corresponding axis. For each level of radial pull $F_X$ and for each level of axial compression $F_Z$, the sag profile $Z_{Surf}$ for a given surface can be expressed as $Z_{Surf}(x, y; F_X, F_Z)$.

From the FEA with the transverse/radial load applied along the x-axis, one obtains $Z_{Surf}(x, y=0; F_X, F_Z)$. With the assumption that the profile in the orthogonal unstretched (y-) direction is similar to the pure axial compression case, one can obtain $Z_{Surf}(x=0, y; F_X, F_Z)=Z_{Surf}(x=0, y; F_X=0, F_Z)$. At the next step, then, appropriate interpolation of the sag profile $Z_{Surf}$ along oblique directions between the x- and y-axes. For carry out such interpolation, first a sag profile is determined to be used for each of the four base directions ($\pm X$ and $\pm Y$). A person of skill will appreciate that the choice of what profile to use for each of the four base directions ($\pm X$ and $\pm Y$) depends on what aberration we are aiming to study: astigmatism, coma, and spherical. For astigmatism, we used the result from the transverse-loading FEA for the $\pm X$ sag profiles and assumed the $\pm Y$ sag profiles to equal the profiles of the embodiment of Example 1. For coma, we used the result from the transverse-loading FEA for the $\pm X$ sag profiles and assumed the $-X$ and $\pm Y$ sag profiles to equal the profiles of the Example 1. For spherical aberration, we used the result from the transverse-loading FEA for all of the $\pm X$ and $\pm Y$ sag profiles. Regarding interpolation, consider a pure paraboloidal surface. With the use of conversion of the sag profile of a given surface into polar coordinates (that is, in terms of radial and angular coordinates), one preforms the following transformations:

$$Z=Ax^2+By^2 \quad x=r\cos\theta; \quad y=r\sin\theta; \quad \sin^2\theta=1-\cos^2\theta;$$
$$\text{and } Z=(A-B)r^2\cos^2\theta+Br^2$$

Here, it was found that the sag of a profile of a given surface of a lenslet is substantially linear with the square of the cosine the angular coordinate. The azimuthal properties of the lenslet to be simulated were assumed to be paraboloidal so this interpolation scheme (based off the square of the cosine of the angle) could be used. FIGS. 13A, 13B, 13C, and 13D show screenshots of the results of the simulation of the specified axial compression of the pair 110, 120 of the lenslets with the Abaqus FEA software in different situations: under no transverse load (FIG. 13A), transverse load causing a displacement of an edge of the lenslet by 50 microns (FIG. 13C), transverse load causing a displacement of an edge of the lenslet by 100 microns (FIG. 13B), and under transverse load causing a displacement of an edge of the lenslet by 150 microns.

Figure 14A:
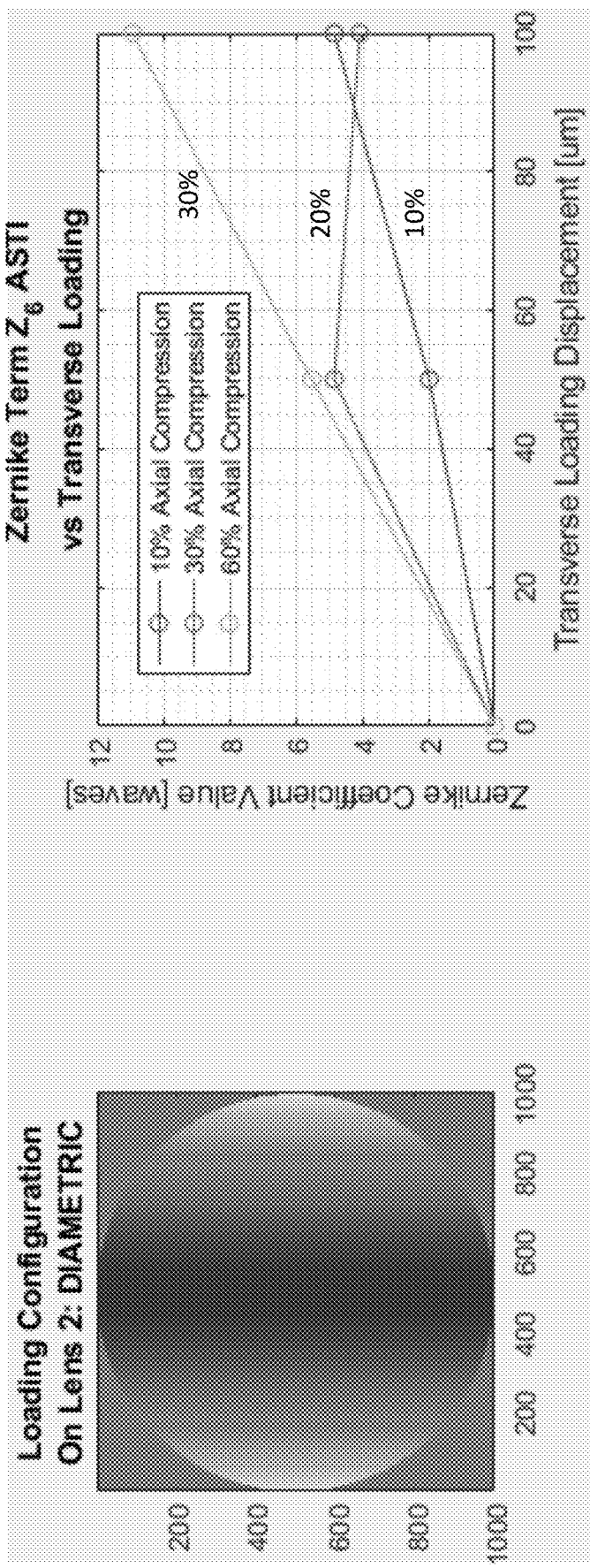
FIGS. 14A, 14B, and 14C provide qualitative illustrations to the process of refocusing the pair of lenslets 110, 120 (of the overall lens system containing such pair) by changing a degree of applanation of the surfaces II, III of these lenslets accompanied by transverse loading (with the radially-vectored force applied to the circumferential edge of the lenslet 120) to stretch the lenslet 120 in a direction transverse to the optical axis. Each of FIGS. 14A, 14B, 14C includes, on the left, a surface plot representing a type of the transverse loading of the lenslet 120, and on the right—the plots representing the identified Zernike aberration terms as functions of the identified different degrees of compression of the pair 110, 120 (corresponding to different degrees of applanation of the surface II, III and, therefore, to the differently-sized flat regions of contact between the lenslets 110, 120 and to the different optical powers of the pair 110, 120).
Figure 14B:
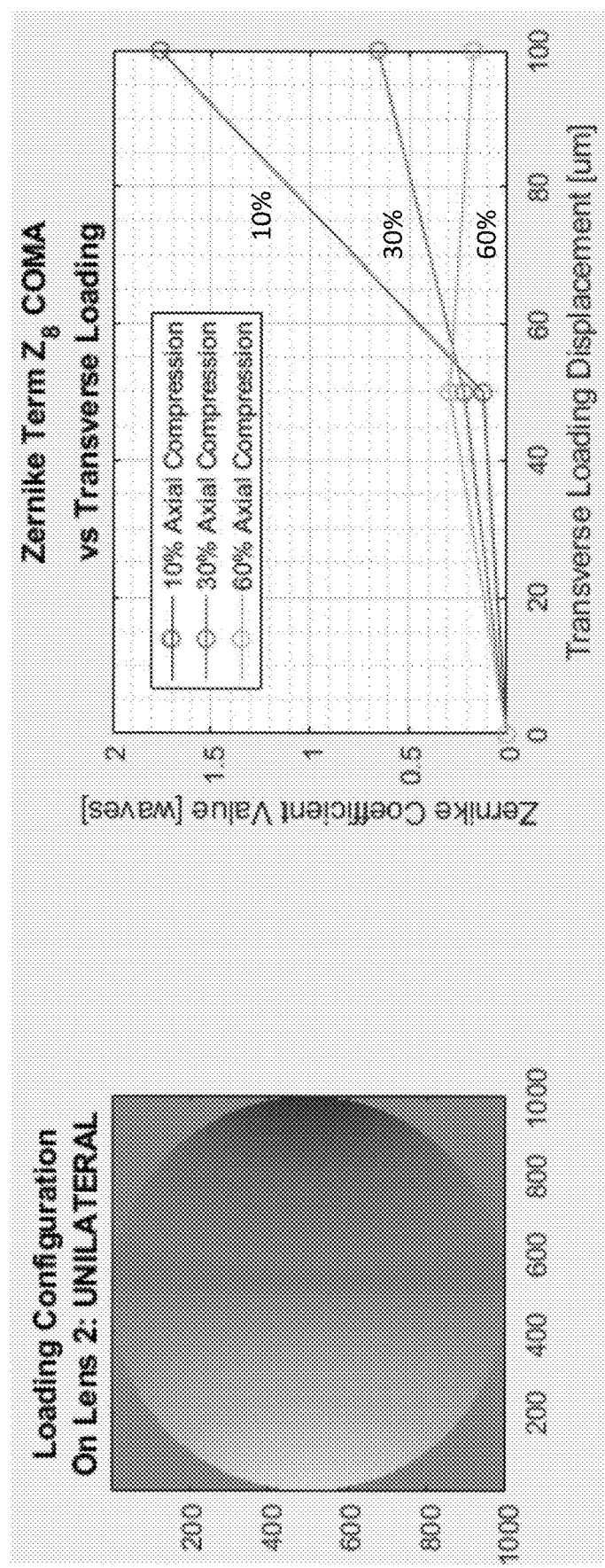
Figure 14C:
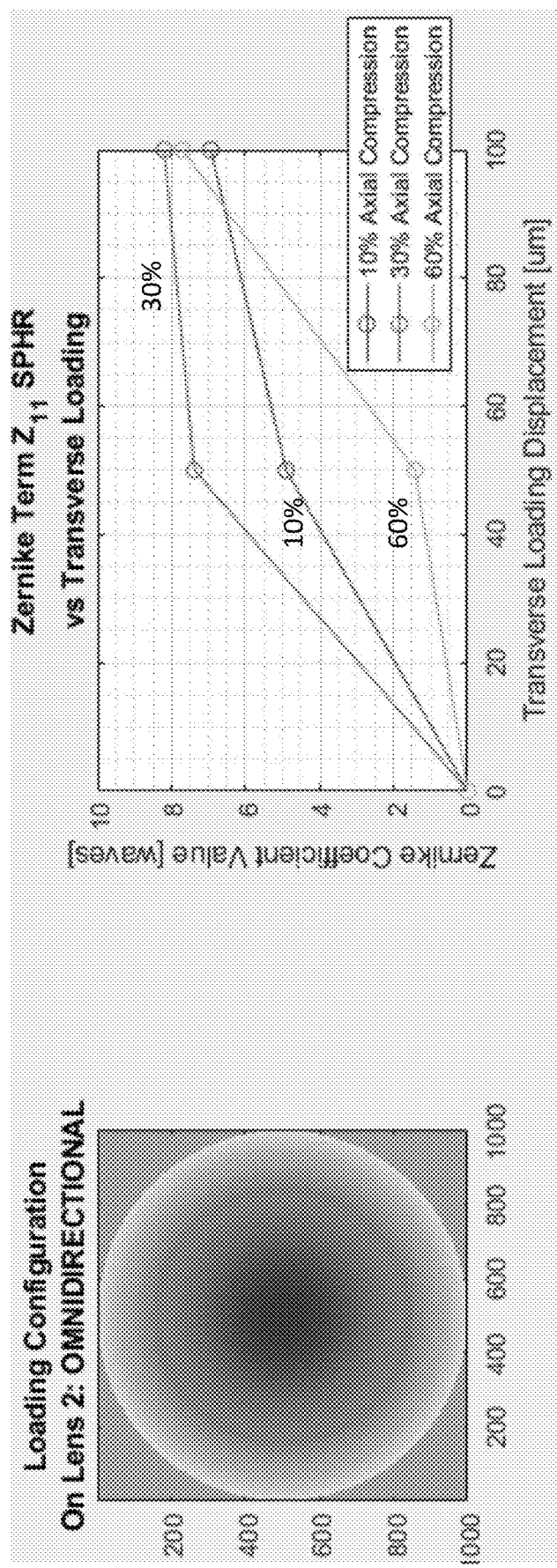

FIGS. 14A, 14B, 14C provide qualitative illustrations to the process of changing a degree of applanation of the surfaces II, III of the pair of lenslets 110, 120 (of the overall lens system containing such pair) accompanied by transverse loading (with the radially-vectored force applied to the circumferential edge of the lenslet 120) to stretch the lenslet 120 in a direction transverse to the optical axis OA. Each of FIGS. 14A, 14B, 14C includes a surface plot representing a type of the transverse loading of the lenslet 120 in the left-hand side of the corresponding figure, and the plots representing the identified Zernike aberration terms as functions of the identified different degrees of compression of the pair 110, 120 (corresponding to different degrees of applanation of the surface II, III and, therefore, to the differently-sized flat regions of contact between the lenslets 110, 120 and to the different optical powers of the pair 110, 120).

Here, addressed are Zernike circle polynomials as known in related art (and for that reason, not discussed here in any detail) that describe mathematically 3-D wavefront deviation from what can be constructed as a plane—i.e. unit circle—of its zero mean (that is, deviations from zero value of the polynomial as a function of change in radial coordinate p and angular coordinate θ), defined as a surface for which the sum of deviations on either side-opposite in sign one to another-equals zero. Each polynomial describes specific form of surface deviation; their combined sum can produce a large number of more complex surface shapes, that can be fit to specific forms of wavefront deviations (aberrations). As known in the art, in principle, by including sufficient number of Zernike polynomials (commonly referred to as terms), any wavefront deformation can be described to a desired degree of accuracy.

The surface plot of FIG. 14A illustrates the situation in which the transverse loading force is applied to the edge of the lenslet 120 at two diametrically-opposed points such as to stretch the lenslet 120 at these points in two opposing directions perpendicularly to the optical axis, while the variation of astigmatism introduced by the pair 110, 120 is shown in the plots at the right-hand side of FIG. 14A. The surface plot of FIG. 14B illustrates the situation in which the transverse loading force is applied to the edge of the lenslet 120 at only one point (while keeping the lenslet 120 centered at the optical axis) thereby causing the unidirectional stretching of the lenslet 120 along its diameter, while the variation of coma introduced by the pair 110, 120 is presented on the right-hand side of FIG. 14A. The surface plot of FIG. 14C illustrates the situation when the transverse loading force is applied to the circumference of the lenslet 120 radially at every point of the outer perimeter of the lenslet 120, thereby causing the stretching of the lenslet 120 away from the optical axis in the omnidirectional fashion, while spherical aberration introduced by the pair 110, 120 is shown at the right-hand side.

These results, obtained with the use of Zemax simulations of the Zernike aberrations, demonstrate that not only the identified Zernike aberrations corresponding to the specified transverse loading geometry, but other Zernike aberrations can be varies/managed by combining/coupling of the axially-directed force causing the applanation of the lenslet(s) surface(s) with the loading force applied transversely to the optical axis provided and appropriate lenslet actuator scheme is in place.

It is appreciated that general proposed methodology of operating a lens system (that includes multiple elastically-deformable lenslets to change the optical power (focal length) of such system) by changing a degree of applanation of the at least one pair of mutually-facing surfaces of the constituent lenslets may incorporate any and/or every of the additional/auxiliary actions on the constituent lenslets of the system to reduce the wavefront errors that otherwise—in absence of such additional actions-would accompany the process of refocusing of the optical system. Among these additional actions there are at least adding a pre-determined degree of asphericity to the spatial profile of the lenslet surface being applanated, and/or implementation of the same optical system in a format in which the number of constituent lenslets is substantially increased while otherwise maintaining the optical power of the overall system in a no-stress state substantially the same, and/or changing a spatial profile of the lenslet being applanated by bending it with respect to the optical axis, and/or applying a radially-vectored force to at least one portion of the outer perimeter of the lenslet being applanated to affect a predetermined optical aberration introduced by such lenslet.

Generally, each and/or every of the additional/auxiliary actions of bending the lenslet, and applying a radially-vectored force to at least one portion of the outer perimeter of the lenslet being applanated can be generally performed right after an incremental refocusing action causing an increment of variation of the optical power of the system by applying an external force to at least one lenslet of the system along the axis, or substantially simultaneously with such refocusing action, or tight after such incremental refocusing action. Each of the actions performed on lenslet(s) of the overall optical system can be carried out with the appropriate corresponding portion of the supporting structure containing such lenslet(s)—which, in at least one case may be defined by the overall housing structure that at least partially encloses the optical system—and a computer processor or microprocessor or electronic circuitry programmed to apply a stimulus to such supporting structure to enable a movement/translation of such portion in a predetermined direction (axially and/or radially, depending on the specifics of implementation) to apply a corresponding external force to the lenslet of interest.

Not referring to any particular Example of the train of constituent lenslets of an embodiment of the overall optical system discussed thus far, but only for the purposes of schematically illustrating one possible implementation of the overall system of the invention, FIGS. 15A, 15B, 15C, and 15D provide schematic illustrations, in side and front views, of one embodiment 1500 of a multi-lenslet variable-focus lens system structured and operable according to the idea of the invention. Generally, lens system of the invention includes a train (array) of multiple individual lenslets (shown as lenslets 1510, 1520, 1530, 1540) disposed sequentially and co-axially about the optical axis (shown here as 1550) within the housing, 1560, that has an outer shell defining a hollow volume therein. The front surface of lens 1510 (surface I, not marked) corresponds to the front of the lens system. The individual lenses 1510, 1520, 1530, and 1540 are disposed in the hollow and are supported by the support structure dimensioned to support the lens system (1510, 1520, 1530, 1540) and denoted as 1562 (but not shown separately from the housing in the Figures, for simplicity of illustration. Optionally but preferably, the support structure 1562 includes individual lenslet supporting elements-indicated generally as 1562A, 1562B . . . 1562N but also not depicted separately from the housing/support structure for simplicity of illustration). The housing 1560 may be equipped with an appropriate stopper element (not shown) at the front portion 1564 of the housing 1560 to keep the constituent lenslets within the hollow of the housing. As shown in the specific example of FIG. 15A, each two immediately adjacent lenslets are abutting one another at corresponding axial points such that the mutually-facing surfaces of these two immediately adjacent lenslets are in contact with one another at a corresponding axial points. For example, as shown, surfaces II, III of the system (respectively corresponding to lenses 1510, 1520) are in contact at an axial point C, while surfaces VI, VII of the system (respectively corresponding to lenses 1530, 1540) are in contact at an axial point S. Surfaces IV and V (respectively—the back surface of the lenslet 1520 and the front surface of the lenslet 1530) of the system 1500 are not indicated for simplicity of illustration. The group of lenslets 1530, 1540 may represent multiple auxiliary lenslets mentioned elsewhere in this disclosure. According to the idea of the invention, at least one of the surfaces in a pair of mutually-contacting surfaces of the lens system 1500 of the invention may be an aspheric surface. For example, at least one of surfaces II, III may have an aspheric profile about the axis 1550. A lenslet with an aspheric surface (or asphere) is known in the art as a lenslet the surface profile of which is not a portion of a sphere or a cylinder (that is, not a portion of a spherical or cylindrical surface). A surface profile of an aspheric is commonly defined as a function representing the displacement of the surface from the vertex at a given distance from the optical axis. Parameters of such function include the radius of curvature and the conic constant (or conic parameter) defined at the vertex. The term surface is used to denote a boundary between two media or bounds or spatial limits of a tangible element; the surface is understood as that which has length and breadth but not thickness.

Figure 15A:
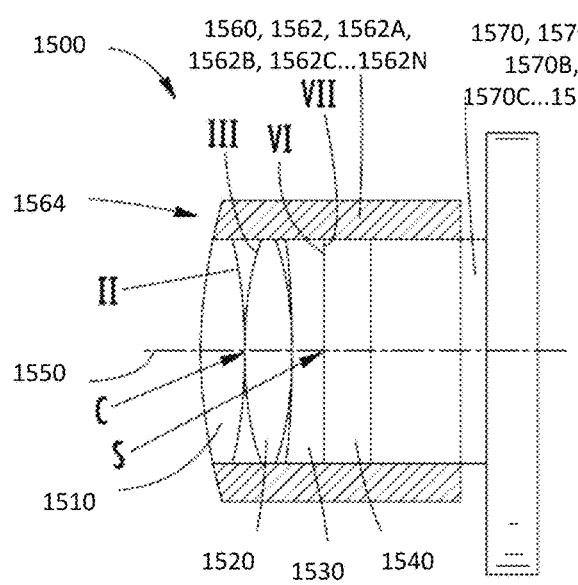
FIGS. 15A and 15B are diagrams illustrating in side and front views an embodiment of a variable-focus lens system containing multiple elastically-deformable constituent lenslets when no applanation is caused by mutually-facing internal surfaces of the system.
Figure 15B:
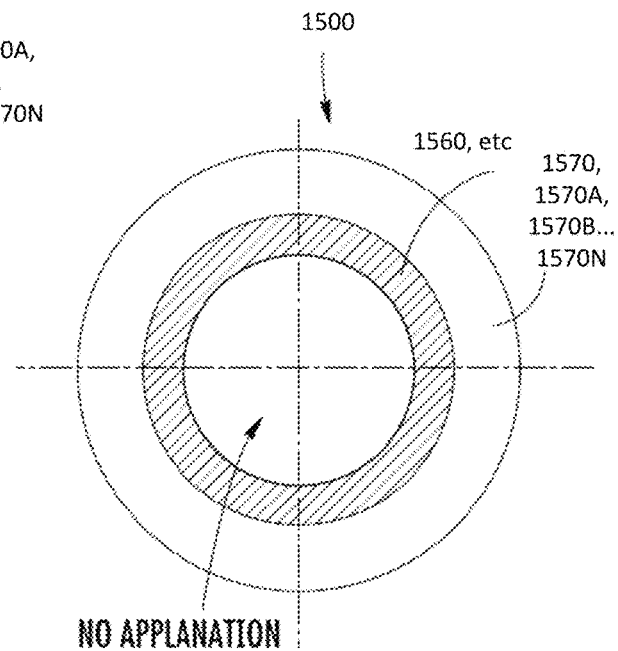

At the back portion of the housing 1560, a lenslet supporting element and/or bearing shown as an actuating piston 1570 is mated (as known in the art) such as to allow for application of pressure or axially-directed force to the train of lenslets as a result of movement of the piston 1570 along the axis 1550. FIGS. 15A and 15B illustrate the status of the embodiment 1500 when the bearing 1570 is in a neutral position defined by no interactive axial force between a lenslet of the system and the surface of the piston. Under these circumstances, as seen in the front view of FIG. 15B, there is substantially no flattening or applanation of any of the internal surfaces of the lens system (stated differently, each of the constituent lenses 1510, 1520, 1530 and 1540 maintain their original no-stress shape). In operation (and in reference to FIGS. 15C, 15D), the bearing 1570 is actuated along the axis 1550—for example, in the direction indicated by an arrow 1574 such at to apply axially-directed (directed along the optical axis) pressure to an individual lens of the system 1500. Overall, according to the idea of the invention-when the lens system includes at least one auxiliary lenslet (1530, 1540) in addition to the base pair of first and second lenslets (1510, 1520), the support structure of the optical system includes an auxiliary bearing movably connecting the auxiliary lenslet support element to the support structure and/or the first lenslet support element and/or the second lenslet support element, thereby enabling a translation of the auxiliary lenslet support element (and hence of the respective auxiliary lenslet) relative to the first lenslet support element and/or relative to the second lenslet support element in response to an auxiliary external force, and thereby enabling a change in an applanated contact area between a surface of such at least one auxiliary lenslet and a surface of the lenslet chosen from the first and second lenslets (with which chosen lenslet the auxiliary lenslet is in contact at an axial point) by altering the auxiliary external force to either compress the at least one auxiliary lenslet and the chosen lenslet against one another along the optical axis or to relax axial pressure exerted by one of the at lest one auxiliary lenslet and the chosen lenslet on the other of the two.

Figure 15C:
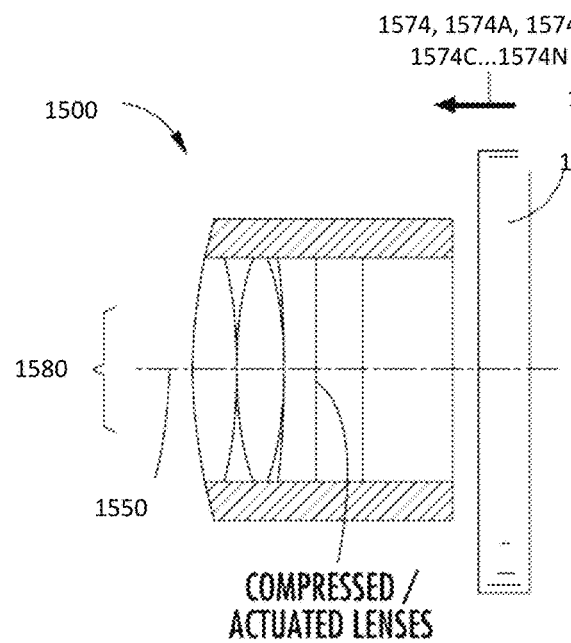
FIGS. 15C and 15D illustrate the side and front views of the embodiment of FIGS. 15A, 15B after the array of individual constituent lenslets of the embodiment has been axially compressed (that is, compressed along the optical axis).
Figure 15D:
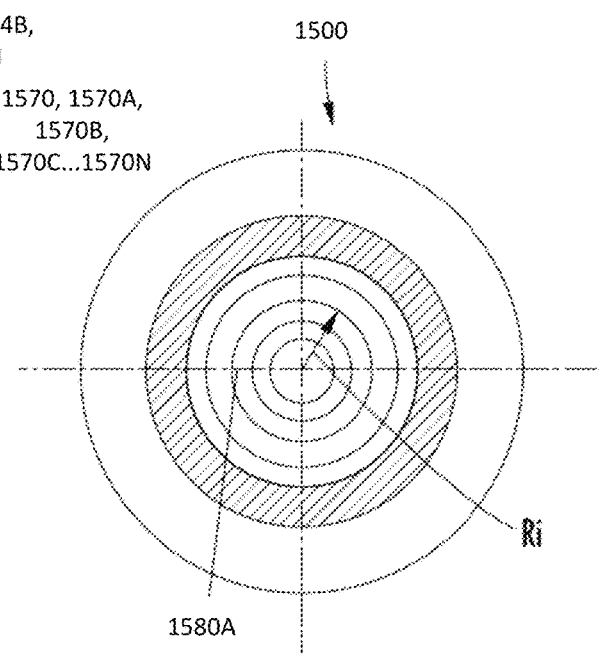

It is appreciated that, depending on a particular design, the support structure in a given optical system can include multiple lenslet support elements and/or corresponding bearings judiciously to apply pressure to any pre-determined constituent lenslet of the system—for example, either to the outermost lens 1540 (thereby creating force F, 1574 directed along the optical axis 1550 and axially-compressing the combination of lenses 1510, 1520, 1530, and 1540), or to another lenslet in the system, or to multiple—but not necessarily all-constituent lenslets of the system. This generalized notion is represented in FIGS. 15A, 15B with additional labels 1570A, 1570B . . . 1570N, which are intended to represent individual lenslet supporting elements/bearings each of which is structured to be cooperated with a specific constituent lenslet of the system to apply a corresponding axially-directed force 1574A, 1574B . . . 1574N. In one specific implementation, for example, the bearing 1570 can be structured to apply pressure only to lenslet 1520, thereby axially compressing the lenses 1510 and 1520 such as to flatten or increase the radius of curvature of at least one of the mutually-facing surfaces II, III. In another specific case, illustrated in FIG. 15A, the bearing 1570 is structured to compress the whole group of the constituent lenslets of the embodiment 1500 by applying axially-directed force to the outermost lenslet 1540, which is proximal to the bearing 1570. As a result—and as a function of the strength of the axially-applied force caused by the movement of the bearing 1570—at least one of the facing-each-other surfaces of the immediately-adjacent lenslets is deformed in that, at such surface, an axially-centered applanated (that is, centered on the optical axis and flattened as compared to the shape of a stand-alone lenslet) area 1580 is formed. A radius of the flattened area 1580 (and therefor the surface area of the area 1580) increases as a function of increasing force F and, when the strength of the force F is reduce-reduces. FIG. 15D illustrates a progression 1580A of such applanated areas 1580 with respectively corresponding radii $R_i$ increasing as a function of increasing force F.

It is appreciated that, in one embodiment, both facing each other surfaces of the two immediately neighboring lenslets are configured to change their curvatures at least at the respectively corresponding areas at and/or around the optical axis if the system. In at least one implementation of the system of FIGS. 15A, 15B, 15C, 15D the curvatures of both surfaces II and III and/or the curvatures of both surfaces IV and V and/or the curvatures of both surfaces VI and VII may be reduced or increased in response to repositioning the piston 1570, depending on the direction of such repositioning with respect to the front of the lens system 1500. Understandably, the process of flattening of the axially-centered area 1580 of at least one constituent lenlet's surface is reversible and repeatable. To this end, the material of the constituent lenslets works as a spring reversing the actuation of the lens in proportion to reduction in actuation pressure at the piston 1570.

In one specific implementation, the housing 1560 may be a cylindrical construction made of a rigid material (for example, metal) while the actuating cylinder of the bearing (s) 1570 etc. may be made of an optically clear material having a modulus of elasticity of more than 1,000 kPA (such as poly-methyl-methacrylate, PMMA, for example). The first lenslet 1510 in the series of lenslets may be also made rigid with a high modulus of elasticity (such as that of PMMA). The remainder of the internal constituent lenslets (as shown, lenses 1520, 1530, and 1540) may be constructed of a much softer material such as silicone, acrylic, or collamer having a modulus of elasticity within the range of 0.1 kPa to 100 kPa. At least one internal surface (such as surface II and/or surface III and/or surface VI, for example) may be compressed between the rigid bearing 1570 and rigid lenslet 1510 upon the movement of the bearing towards the front of the system 1500, thereby progressively negating the optical power contribution of such surface(s) to the overall lens system 1500 as the surface(s) flatten over an increasing diameter $2R_i$, as shown in FIG. 15C. Optionally but preferably, so deformable surface(s) may be dimensioned to be aspheric (for example—prolate aspheric) with such a conic constant as i) to increase the sphericity of such surface as a result of progressive applanation caused by the mechanical compression due to force F, beginning at the apex of a given surface; ii) to minimize the discontinuity of spatial transition between the applanated portion of the surface (centered at the axis 1550) and the portion of the lenslet surface encircling such applanated area, and (iii) to minimize optical aberrations throughout the range of change of optical power such that, when mutually facing internal surfaces of the lens system are being progressively applanated, the shape of the aspheric surface in question becomes more planar. It is appreciated that—as far as Examples discussed elsewhere in this disclosure are concerned—the lenslets 1510, 1520 of the embodiment of FIG. 16A may correspond to the lenslets 110, 120 can represent The related methodology of operating a lens system (an optical system) containing a multiplicity of compliant (elastically deformable) constituent lenslets includes the process of refocusing the lens system during the process of changing a degree of applanation of an internal surface of at least one of the constituent lenslets as a result of repositioning at least one of the surfaces of at least one of the constituent lenslets along the optical axis, and is complemented with one or more of the processing steps the implementation of which allows the user to reduce the wavefront errors cause by such changing the degree of applanation—as was considered in the Examples presented above. In particular, an embodiment of a method for operating an optical system that has an optical axis includes step (a) of transmitting light, incident onto a front surface of the optical system having a first optical power, through two surfaces of constituent first and second lenslets of the optical system (which lenslets are coaxial with the optical axis and in contact with one another at a first contact region having a first contact surface area and centered on the optical axis). The method additionally includes step (b) of changing an optical power of the optical system from the first optical power to a second optical power by axially repositioning a first of the two surfaces along the optical axis to form a second contact region between the first and second of the two surfaces. (Here, the second contact region has a substantially flat surface and has a second contact surface area different from the first contact surface area). The method additionally includes one or more of the following additional steps: step (c) of altering an auxiliary external force to either compress at least one auxiliary lenslet and a chosen lenslet of the constituent first and second lenslets against one another along the optical axis or to relax axial pressure exerted by one of the at least one auxiliary lenslet and the chosen lenslet on the other, thereby changing an applanated contact area between a surface of the at least one auxiliary lenslet and a surface of the chosen lenslet; and step (d) of shifting at least a portion of a circumferential edge of at least one of constituent lenslets of the optical system along the optical axis while substantially not affecting an axial position of a center of said at least one of constituent lenslets. Example 5 provided non-limiting embodiments of alternative but related implementations of step (d). In addition or alternatively, € such implementation of the method can be implemented in which at least one of steps (b) and (c) includes changing a degree of applanation of a first aspheric surface and/or a second aspheric surface of two facing each other surfaces of constituent lenslets of the optical system. Further more, alternatively or in addition, step (f) of applying a radially-directed load to a circumferential edge of at least one of constituent lenslets of the optical system and be employed with steps (a) and (b). As discussed above, the combination of the steps (c) and/or (d) and/or (e) and/or (f) with the steps (a) and (b) allows the user to reduce the optical wavefront error introduced by the lens system in operation.

Whether or not a specific processor/microprocessor/electronic circuitry (that may be used to control the process of operation of the refocusing of the embodiments of the lens system as discussed) is shown in the Drawings, such microprocessor is controlled by instructions stored in a memory. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

For the purposes of this disclosure and the appended claims, the expression of the type "element A and/or element B" has the meaning that covers embodiments having element A alone, element B alone, or elements A and B taken together and, as such, is intended to be equivalent to "at least one of element A and element B".

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention. Within this specification, embodiments have been described in a way that enables a clear and concise specification to be written, but it is intended and will be appreciated that embodiments may be variously combined or separated without parting from the scope of the invention. In particular, it will be appreciated that all features described herein at applicable to all aspects of the invention.

When the present disclosure describes features of the invention with reference to corresponding drawings (in which like numbers represent the same or similar elements, wherever possible), the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, at least for purposes of simplifying the given drawing and discussion, and directing the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this particular detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

Moreover, if the schematic flow chart diagram is included, the depicted order and labeled steps of the logical flow are indicative of one embodiment of the presented method. Other steps and order of steps may be conceived that are equivalent in function, logic, or effect to one or more steps, or portions thereof, of the illustrated method. Without loss of generality, the order in which processing steps or particular methods occur may or may not strictly adhere to the order of the corresponding steps shown.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. The use of this term in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated may vary within a range defined by an experimental measurement error that is typical when using a measurement method accepted in the art for such purposes. As an example only, a reference to a vector or line or plane being substantially parallel to a reference line or plane is to be construed as such vector or line extending along a direction or axis that is the same as or very close to that of the reference line or plane (with angular deviations from the reference direction or axis that are considered to be practically typical in the art, for example between zero and fifteen degrees, more preferably between zero and ten degrees, even more preferably between zero and 5 degrees, and most preferably between zero and 2 degrees). A term "substantially-rigid", when used in reference to a housing or structural element providing mechanical support for a contraption in question, generally identifies the structural element that rigidity of which is higher than that of the contraption that such structural element supports. As another example, the use of the term "substantially flat" in reference to the specified surface implies that such surface may possess a degree of non-flatness and/or roughness that is sized and expressed as commonly understood by a skilled artisan in the specific situation at hand. For example, the terms "approximately" and "about", when used in reference to a numerical value, represent a range of plus or minus 20% with respect to the specified value, more preferably plus or minus 10%, even more preferably plus or minus 5%, most preferably plus or minus 2%.

The invention as recited in claims appended to this disclosure is intended to be assessed in light of the disclosure as a whole, including features disclosed in prior art to which reference is made.

LIST OF REFERENCE NUMERALS

100 at least a portion of a lens system
104 optical axis
110, 120 constituent lenslet(s) of a lens system
710, 730 bearing(s)/lenslet supporting element(s)
710A, 730A contact area(s) between bearing(s)/lenslet supporting element(s) and corresponding lenslet
800 at least a portion of a lens system
810, 820 constituent lenslet(s) of a lens system
810A, 820A moment-inducing extension(s) from a lenslet/haptic
1500 optical system
1510, 1520, 1530, 1540 constituent lenslet(s) of an optical system
1550 optical axis
1560 housing
1562 support structure
1562A, 1562B . . . 1562N support elements of individual lenslets
1564 front portion of a housing
1570, 1570A, 1570B . . . 1570N bearings
1574, 1574A, 1574B . . . 1574N axially-directed force(s)
1600 at least a portion of a lens system
1630 constituent lenslet of a lens system I, II, III, IV, V, VI, VII and on surfaces of constituent lenslets of a lens system

What is claimed is:

1. An optical system having an optical axis and comprising:
   a first lenslet coaxial with the optical axis and having a first front surface and a first back surface,
   a second lenslet disposed coaxially with the first lenslet and having a second front surface and a second back surface,
      wherein the first back surface and second front surface contact each other at an axial point on said optical axis when the first and second lenslets are not under stress;
   a support structure comprising a first lenslet support element supporting the first lenslet and a second lenslet support element supporting the second lenslet,
   a first bearing and/or a second bearing movably connecting the first lenslet support element and/or the second lenslet support element relative to each other and/or the support structure, and configured to translate the first lenslet support element and/or second lenslet support element substantially parallel to the optical axis and/or to alternate stress applied to at least one of the respectively supported first and second lenslets to applanate at least one of the first back surface and the second front surface and to enable alteration of an applanated area of contact between the first back surface and the second front surface that is centered on the optical axis (i) by applying a first external force that advances or retracts at least one of the first lenslet support element and the second lenslet support element with respect to the other and/or (ii) by applying a second external force vectored substantially transversely to the optical axis to the first lenslet and/or the second lenslet, wherein the optical system satisfies one or more of the following conditions (a), (b), (c), (d), and (e):

condition (a); the support structure further comprises an auxiliary lenslet support element supporting at least one auxiliary lenslet that is coaxial with the optical axis and in contact with a surface of a chosen lenslet of the first and second lenslets of the optical system only at an axial point thereof when the auxiliary lenslet and the chosen lenslet are not under stress, wherein the support structure further comprises an auxiliary bearing movably connecting the auxiliary lenslet support element to the support structure and/or the first lenslet support element and/or the second lenslet support element, thereby enabling a translation of the auxiliary lenslet support element relative to the first lenslet support element and/or relative to the second lenslet support element in response to the auxiliary external force, and thereby enabling a change in an applanated contact area between a surface of the at least one auxiliary lenslet and a surface of the chosen lenslet by altering an auxiliary external force to either compress the at least one auxiliary lenslet and the chosen lenslet against one another along the optical axis or to relax axial pressure exerted by one of the at least one auxiliary lenslet and the chosen lenslet on the other of the at least one auxiliary lenslet and the chosen lenslet;

wherein an alternation of the auxiliary external force applanates the surface of the at least one auxiliary lenslet and/or the surface of the chosen lenslet and enables a change in an auxiliary surface area of contact between the surface of the at least one auxiliary lenslet and the surface of the chosen lenslet;

condition (b): at least one of lenslet support elements present in the optical system has corresponding first contacting area and second contacting area cooperated with a corresponding lenslet of the optical system at two respective different radial positions, wherein the first contacting area and the second contacting area are coupled mechanically with one another to transfer force applied to at least one of the first and second contacting areas onto the corresponding lenslet to thereby reversibly shift at least a portion of a circumferential edge of the corresponding lenslet along the optical axis while substantially not affecting an axial position of a center of the corresponding lenslet;

condition (c): two immediately neighboring lenslets of constituent lenslets of the optical system comprise respective haptics extending radially from circumferential regions of said two immediately neighboring lenslets, wherein the respective haptics are dimensioned to be in contact with one another at respective ends thereof to transfer an axial force applied to at least one of the two immediately neighboring lenslets to at least a part of the circumferential edge of the at least one of the two immediately neighboring lenslets to thereby reversibly shift the at least said part along the optical axis while substantially not affecting an axial position of a center of the at least one of the two immediately neighboring lenslets;

condition (d): at least one of facing and contacting each other surfaces of the two immediately neighboring lenslets includes, in an unstressed state, an aspheric surface centered on the optical axis;

condition (e): the support structure further comprises a radial loader device movably supported between an inner loader position and an outer loader position, wherein the inner loader position is defined at a first radial distance from the optical axis and the outer loader position is defined at a second radial distance from the optical axis, wherein the second radial distance is larger than the first radial distance, wherein the radial loader device is attached to a respective circumferential edge of at least one of the first, second, and the at least one auxiliary lenslets to apply radially-directed force to said circumferential edge;

and wherein the support structure includes a housing unit defining a hollow therein, wherein respective portions of said first lenslet, said second lenslet, and the at least one auxiliary lenslet are disposed in the hollow, and wherein a respective portion of at least one of the first, second, and auxiliary support elements is dimensioned to reversibly move inside the hollow along the optical axis.

2. The optical system according to claim 1, wherein the respective portion of at least one of the first, second, and auxiliary support elements includes a piston, or wherein a surface of the hollow carries a thread dimensioned to guide said respective portion of at least one of the first, second, and auxiliary support elements.

3. The optical system according to claim 2, wherein, when the condition (9a) is satisfied, the at least one auxiliary lenslet includes multiple auxiliary lenslets such that the optical system comprises a set of four or more constituent lenslets each contacting an immediately neighboring constituent lenslet at an axial point thereof when said four or more constituent lenslets are not under stress.

4. The optical system according to claim 2, wherein, when the condition (9b) is satisfied, at least one of the first contacting area and the second contacting area is at least a portion of a ring centered on the optical axis.

5. The optical system according to claim 2, wherein, when the condition (9c) is satisfied, the haptics include corresponding annuli each having an inner perimeter attached to a circumferential edge of a corresponding of the two immediately neighboring lenslets.

6. The optical system according to claim 2, wherein, when the condition (9d) is satisfied, the aspheric surface is a prolate aspheric surface.

7. The optical system according to claim 1, wherein, when the condition (a) is satisfied, the at least one auxiliary lenslet includes multiple auxiliary lenslets such that the optical system comprises a set of four or more constituent lenslets each contacting an immediately neighboring constituent lenslet at an axial point thereof when said four or more constituent lenslets are not under stress.

8. The optical system according to claim 7, wherein, when the condition (c) is satisfied, the haptics include corresponding annuli each having an inner perimeter attached to a circumferential edge of a corresponding of the two immediately neighboring lenslets.

9. The optical system according to claim 1, wherein, when the condition (b) is satisfied, at least one of the first contacting area and the second contacting area is at least a portion of a ring centered on the optical axis.

10. The optical system according to claim 9, wherein, when the condition (d) is satisfied, the aspheric surface is a prolate aspheric surface.

11. The optical system according to claim 1, wherein, when the condition (c) is satisfied, the haptics include corresponding annuli each having an inner perimeter attached to a circumferential edge of a corresponding of the two immediately neighboring lenslets.

12. The optical system according to claim 1, wherein, when the condition (d) is satisfied, the aspheric surface is a prolate aspheric surface.

13. A method comprising:
  with the use of the optical system according to claim 1:
    transmitting light, incident onto a front surface of the optical system, through two surfaces of the first and second lenslets;
    changing an optical power of the optical system from a first optical power to a second optical power by axially repositioning a first of the two surfaces along the optical axis to form a contact region between the first of the two surfaces and a second of the two surfaces, the contact region having a substantially flat surface and having a contact surface area different from a corresponding contact surface area before said changing;
  wherein at least one of the following conditions is satisfied:
  condition (a): the method further comprises altering an auxiliary external force to compress at least one auxiliary lenslet and a chosen lenslet of the first and second lenslets against one another along the optical axis or relaxing axial pressure exerted by one of the at least one auxiliary lenslet and the chosen lenslet on the other, thereby changing an applanated contact area between a surface of the at least one auxiliary lenslet and a surface of the chosen lenslet;
  condition (b): the method further comprises shifting at least a portion of a circumferential edge of at least one of constituent lenslets of the optical system along the optical axis while substantially not affecting an axial position of a center of said at least one of constituent lenslets;
  condition (c) wherein at least one of
    said changing the optical power of the optical system from the first optical power to the second optical power by axially repositioning the first of the two surfaces along the optical axis, and
    said altering the auxiliary external force
  includes changing a degree of applanation of a first aspheric surface and/or a second aspheric surface of two facing each other surfaces of constituent lenslets of the optical system;
  and
  condition (d): the method further comprises applying a radially-directed load to a circumferential edge of at least one of constituent lenslets of the optical system,
    wherein at least one of said altering an auxiliary external force, said shifting, said changing the degree of applanation of the first aspheric surface and/or the second aspheric surface, and said applying the radially-directed load is carried out substantially simultaneously with said changing the optical power of the optical system from the first optical power to the second optical power.

14. A method according to claim 13, wherein each of said changing the optical power of the optical system from the first optical power to the second optical power, said altering an auxiliary external force, said shifting, said changing the degree of applanation of the first aspheric surface and/or the second aspheric surface, and said applying the radially-directed load is carried out reversibly.

15. A method according to claim 13, wherein said shifting and/or said changing the degree of applanation of the first aspheric surface and/or the second aspheric surface, and/or said applying the radially-directed load is/are performed on only a subset but not all of the constituent lenslets of the optical system.

16. A method according to claim 15, wherein said subset includes every other constituent lenslet from said all of the constituent lenslets of the optical system.

\* \* \* \* \*